United States Patent [19]

Ohara et al.

[11] Patent Number: 5,866,672
[45] Date of Patent: Feb. 2, 1999

[54] FLAME RETARDANT POLYETHYLENE TEREPHTHALATE RESIN COMPOSITION

[75] Inventors: Youichi Ohara; Kazuaki Matsumoto, both of Osaka; Masahiko Mihoichi, Hyogo; Kazushi Hirobe, Osaka, all of Japan

[73] Assignee: Kanegafuchi Kagaku Kogyo Kabushiki Kaisha, Osaka, Japan

[21] Appl. No.: 732,440

[22] PCT Filed: Mar. 7, 1996

[86] PCT No.: PCT/JP96/00552

§ 371 Date: Jun. 19, 1997

§ 102(e) Date: Jun. 19, 1997

[87] PCT Pub. No.: WO96/28512

PCT Pub. Date: Sep. 19, 1996

[30] Foreign Application Priority Data

| Mar. 10, 1995 | [JP] | Japan | 7-079701 |
| Mar. 10, 1995 | [JP] | Japan | 7-079702 |
| Mar. 10, 1995 | [JP] | Japan | 7-079703 |
| Mar. 10, 1995 | [JP] | Japan | 7-079704 |
| Mar. 10, 1995 | [JP] | Japan | 7-079705 |
| Mar. 10, 1995 | [JP] | Japan | 7-079706 |
| Jun. 22, 1995 | [JP] | Japan | 7-180666 |
| Sep. 22, 1995 | [JP] | Japan | 7-244695 |
| Sep. 29, 1995 | [JP] | Japan | 7-254040 |
| Oct. 6, 1995 | [JP] | Japan | 7-286628 |

[51] Int. Cl.$^6$ ................................. C08G 63/18
[52] U.S. Cl. ................ 528/305; 528/271; 528/272; 528/309
[58] Field of Search ................... 528/271, 272, 528/305, 309

[56] References Cited

U.S. PATENT DOCUMENTS 4,223,125  9/1980  Bier et al. .................. 528/305

FOREIGN PATENT DOCUMENTS

| 59-6251 | 1/1984 | Japan . |
| 1-201357 | 8/1989 | Japan . |
| 2-202541 | 8/1990 | Japan . |
| 5-17669 | 1/1993 | Japan . |

*Primary Examiner*—Terressa Mosley
*Attorney, Agent, or Firm*—Armstrong, Westerman, Hattori, McLeland & Naughton

[57] ABSTRACT

There are disclosed a flame retardant polyethylene terephthalate resin composition comprising (A) a polyethylene terephthalate resin containing ethylene terephthalate units as a main constituent, prepared by the use of a germanium compound as a catalyst, (B) a halogen flame retardant, (C) at least one compound selected from the group consisting of epoxy compounds and carbodiimide compounds and (D) an antimony compound, and moreover, resin compositions further containing, besides those (A), (B), (C) and (D), at least one selected from the group consisting of (E) a reinforcing filler, (F) at least one inorganic compound composed of silicates and silicic acid and (G) a crystallization accelerator. The resin compositions are excellent in physical properties and wet heat resistance. By the addition of the specific inorganic compounds and the crystallization accelerators, releasability is also improved and thus high cyclization of molding is possible.

15 Claims, No Drawings

FLAME RETARDANT POLYETHYLENE TEREPHTHALATE RESIN COMPOSITION

TECHNICAL FIELD

The present invention relates to flame retardant polyethylene terephthalate resin compositions and, more particularly, to flame retardant polyethylene terephthalate resin compositions also excelled in wet heat resistance as well as mechanical properties.

BACKGROUND ART

Polyethylene terephthalate resins with their excellent mechanical and electrical properties have been widely used to date as materials of fibers, films and the like and also as molding materials. Since their mechanical properties and thermal properties are largely improved when they are admixed with reinforcing fibers especially glass fiber, hence the reinforced resin compositions so obtained are suited for use as materials of so-called functional parts.

In recent years, there has been a growing demand for safety against fire especially in the field of electric or electronic parts and, to meet such demand, effort has been made for impartation of flame retardance to resins by addition of organic halogen compounds or high-molecular halogen compounds. A portion of electric and electronic parts for which such flame-retardant materials are used includes members, which are brought into direct or indirect contact with water or water vapor, and in such a field a high wet heat resistance, which means capability of preventing sudden lowering of mechanical strength even under high temperature and high humidity conditions, is required, in addition to high flame retardance.

As to flameproofing of thermoplastic polyester, there have been proposed a method of adding a halogenated polystyrene resin as disclosed in, for example, Laid-open Patent Publication No. 92346/'75, methods of adding halogenated epoxy resin in Laid-open Patent Publication No. 35257/'75 and Laid-open Patent Publication No. 15256/'87 and a method of adding high polymer halogenated phenoxy resin in Laid-open Patent Publication No. 149954/84.

Further, for improving flame retardance and also its resistance to moisture, a method of adding a high-molecular halogenated and copolymerized phenoxy resin together with an epoxy compound and/or a carbodiimide compound as disclosed in Laid-open Patent Publication No. 129253/84.

When a halogenated polystyrene resin, a halogenated phenoxy resin and the like as mentioned above are used as flame retardants, there are problems with regard to dispersibility thereof in polyethylene terephthalate resins or their individual flow properties (fluidity), while, when the halogenated epoxy resin is used, the flow property at a high temperature is deteriorated due to its reactivity with the polyethylene terephthalate and, in addition thereto, there is a problem of the added resin tending to bleed on the surface of molded articles when heated. Thus, problems are likely to occur about moldability, mechanical strength and surface characteristics.

Further, with regard to the demand for high wet heat resistance, addition of an epoxy compound or a carbodiimide compound alone is insufficient.

The object of the present invention is, therefore, to obtain a polyethylene terephthalate resin composition to which flame retardance is imparted without deterioration of moldability and mechanical strength and which is also improved in wet heat resistance.

After extensive and intensive studies, the present inventors have found out that the aforementioned object can be attained by the use of a polyethylene terephthalate resin produced with a germanium compound as a catalyst, and by the addition of a halogen flame retardant and the specific class of compounds or by the addition of a halogenated epoxy resin, and thus arrived at the present invention.

DISCLOSURE OF THE INVENTION

The present invention relates, in a first aspect, to a flame retardant polyethylene terephthalate resin composition comprising
 (A) a polyethylene terephthalate resin containing ethylene terephthalate units as a main constituent, prepared by the use of a germanium compound as a catalyst 100 parts by weight,
 (B) a halogen flame retardant 1–60 parts by weight,
 (C) at least one compound selected from the group consisting of epoxy compounds containing at least 2 epoxy groups in the molecule and carbodiimide compounds 0.05–20 parts by weight,
 (D) an antimony compound 0.1–20 parts by weight, and
 (E) a reinforcing filler 0–150 parts by weight.

The present invention relates, in a second aspect, to a flame retardant polyethylene terephthalate resin composition comprising
 (A) a polyethylene terephthalate resin containing ethylene terephthalate units as a main constituent, prepared by the use of a germanium compound as a catalyst 100 parts by weight,
 (B') a halogen flame retardant containing at least 2 epoxy groups in the molecule 1–60 parts by weight,
 (D) an antimony compound 0.1–20 parts by weight, and
 (E) a reinforcing filler 0–150 parts by weight.

The present invention relates, in a third aspect, to a flame retardant polyethylene terephthalate resin composition which comprises further adding to the resin composition of the above invention of the first or second aspect,
 (F) at least one inorganic compound selected from the group consisting of silicates and silicic acid 0.1–60 parts by weight.

The present invention relates, in a fourth aspect, to a flame retardant polyethylene terephthalate resin composition which comprises further adding to the resin composition of the above invention of the first, second or third aspect,
 (G) a crystallization accelerator 0.05–50 parts by weight.

BEST MODES OF CARRYING OUT THE INVENTION

The polyethylene terephthalate resin (A) used for the present invention is a polyester type resin with ethylene terephthalate units as a main constituent, which is obtained by using terephthalic acid or its derivatives capable of forming esters as an acid constituent, ethylene glycol or its derivatives capable of forming esters as a glycol constituent, and by using a germanium compound as a catalyst.

As the germanium compound used as a catalyst, there are included germanium oxides such as germanium dioxide, germanium alkoxides such as germanium tetraethoxide and germanium tetraisopropoxide, germanium hydroxide and its alkali metal salts, germanium glycolate, germanium chloride, germanium acetate and the like, which may be used alone or in combination of two or more. Of these germanium compounds, germanium dioxide is particularly preferred.

The amount to be added of such germanium compound is normally required to be sufficient for enhancing polymerization but preferably to be 0.005–0.1% by weight and more preferably 0.01–0.05% by weight of the resulting polyethylene terephthalate resin. If the amount added is less than 0.005% by weight, the progress of polymerization may be too slow, while, if it is in excess of 0.1% by weight, it is not preferable, either, since some unfavorable side reactions might result. Addition of such germanium compounds may be done at any time before start of polymerization.

The polyethylene terephthalate resin (A) used in the present invention is preferred to contain preferably not less than 80%, more preferably not less than 85%, and still preferably not less than 90% of the repeated units of ethylene terephthalate. When the proportion of the repeated units of ethylene terephthalate is less than 80%, the excellent balance of physical properties of the polyethylene terephthalate resin tends to be lost.

This polyethylene terephthalate resin allows use of copolymerizable constituents in a range of amount lest any thereof should affect or otherwise cause deterioration of flame retardance, moldability and mechanical properties. As such constituents, there are included carboxylic acids such as divalent or more aromatic carboxylic acid 8–22 in carbon number, divalent or more aliphatic carboxylic acids 3–12 in carbon number, divalent or more alicyclic carboxylic acids 8–15 in carbon number and their ester-forming derivatives, and compounds having two or more hydroxyl groups in each molecule selected from the group consisting of aliphatic compounds 3–15 in carbon number, alicyclic compounds 6–20 in carbon number, aromatic compounds 6–40 in carbon number and their ester-forming derivatives. These may be used either alone or in combination of two or more.

As the carboxylic acid, specifically, there are included, besides terephthalic acid, phthalic acid, isophthalic acid, naphthalenedicarboxylic acid, bis (p-carboxyphenyl) methane anthracenedicarboxylic acid, 4,4'-diphenyldicarboxylic acid,1,2-bis(phenoxy)ethane-4,4'-dicarboxylic acid, adipic acid, sebacic acid, azelaic acid, dodecane dicarboxylic acid, maleic acid, trimesic acid, trimellitic acid, pyromellitic acid, 1,3-cyclohexane dicarboxylic acid, 1,4-cyclohexanedicarboxylic acid, decahydronaphthalene dicarboxylic acid and their derivatives having ester-forming capability. As the hydroxyl group-containing compound, there are included besides ethylene glycol, propylene glycol, butanediol, hexanediol, decanediol, neopentyl glycol, cyclohexanedimethanol, cyclohexanediol, 2,2'-bis(4-hydroxyphenyl)propane, 2,2'-bis(4-hydroxycyclohexyl)propane, hydroquinone, glycerol, pentaerythritol and their derivatives capable of forming esters. Oxy-acids such as p-oxybenzoic acid and p-hydroxyethoxybenzoic acid and their derivatives capable of forming esters, cyclic esters such as ε-caprolactone and the like are also usable. Further, usable are polyalkylene glycols such as polyethylene glycol, polypropylene glycol and block and/or random copolymers of poly (ethylene oxide.propylene oxide), ethylene oxide addition copolymer of bisphenol A, and polytetramethylene glycol, and further ethylene oxide addition polymers of glycerol. These may be used either alone or in combination of two or more.

The proportion of the aforementioned constituents to be copolymerized is generally not more than 20% by weight, preferably not more then 15% by weight and still more preferably not more than 10% by weight. If the proportion should exceed 20% by weight, the excellent balance of physical properties of the polyethylene terephthalate resin tends to be lost.

The intrinsic viscosity of the aforementioned polyethylene terephthalate resin, [which was measured at 25° C. in a mixed solvent of phenol:1,1,2,2-tetrachloroethane=1:1(ratio by weight)] was 0.35–1.50 dl/g, preferably 0.4–1.20 dl/g and still more preferably 0.50–0.95 dl/g. If the intrinsic viscosity so determined is less than 0.35 dl/g, the mechanical strength is insufficient, while, if it is in excess of 1.50 dl/g, moldability is lowered, this being unfavourable, either.

The aforementioned polyethylene terephthalate resins may be used alone or in combination of two or more which are different in copolymerized constituents and/or in intrinsic viscosity.

As to the producing method for the polyethylene terephthalate, there is no particular limitation except for a catalyst used and any commonly known method may be used. As a polymerization method, for example, bishydroxyethylene terephthalate or a polymer low in degree of polymerization whose principal constituent is ethylene terephthalate units is synthesized by direct esterification of terephthalic acid and ethylene glycol in the absence or presence of a catalyst for enhancing esterification, or by transesterification of dimethyl terephthalate and ethylene glycol in the presence of a catalyst for enhancing esterification or the like, thereafter, a germanium compound is added and a temperature of approximately 250°–300° C. and a vacuum of approximately 133 Pa (1 Torr) are kept, and under such conditions molten condensation polymerization is carried out or at a lowered temperature of approximately 150°–250° C. condensation polymerization was carried out in solid phase for the production of a polyethylene terephthalate.

When polymerization polyethylene terephthalate resins polymerized by the use of, for example, an antimony compound other than a germanium compound is used, no favorable result can be hoped for since lowering of the mechanical strength is marked when the resin composition is kept under high temperature and high humidity.

When polyethylene terephthalate resins are produced, antioxidants such as phenol-type antioxidants, phosphorus-type compounds or antioxidants, and sulphur-type antioxidants, heat thermostabilizers, coloring inhibitors or the like may be added before, during or after completion of the reaction. It is also possible to add catalyst-inactivation agents such as phosphorus compounds in the course of or after completion of the reaction.

In the present invention, the halogen flame rertardant (B) is used for the impartation of flame retardance. As specific examples of the halogen flame retardant, there are included halogenated polystyrene resins, halogenated epoxy compounds or resins, halogenated phenoxy resins, halogenated polycarbonate oligomers or resins, halogenated polyphenylene ether resins, halogenated acryl resins, halogenated aryl compounds and halogen-containing phosphorus compounds, of which preferred are halogenated polystyrene resins, halogenated epoxy compounds or resins and halogenated phenoxy resins.

As the specific examples of the aforementioned halogenated polystyrene resin, there are included halogenated polystyrene resins or halogenated poly α-methylstyrene resins, represented by the general formula (1) below:

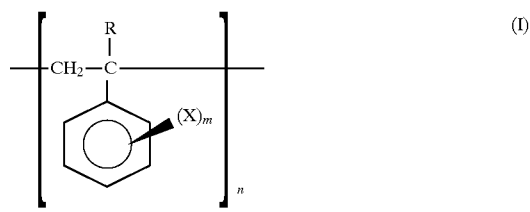

where R is H or $CH_3$ group, X is a halogen atom, m is an integer of 1–5 and n is a number-average polymerization degree.

As specific examples of the halogenated polystyrene resin or halogenated polyα-methylstyrene resin represented by the general formula (I), there are included homopolymers such as polybromostyrenes, polydibromostyrenes, polytribromostyrenes, polypentabromostyrenes, polychrorostyrenes, polydichlorostyrenes, polytrichlorostyrenes, polypentachlorostyrenes, polybromo-α-methylstyrenes, polydibromo-α-methylstyrenes, polytribromo-α-methylstyrenes, block or random copolymers thereof, further brominated or chlorinated polystyrenes or poly α-methylstyrenes and, further, block, random or graft copolymers of polystyrenes and polyα-methyl styrenes. These may be used either alone or in combination of two or more.

The aforementioned halogenated polystyrene resin or halogenated polyα-methylstyrene resin is produced by a method of polymerizing halogenated styrene monomers and/or halogenated-α-methyl styrene monomers or even by a method of halogenating polystyrenes or polyα-methlstyrenes, or the like.

The number-average polymerization degree n of the halogenated polystyrene resin and halogenated polyα-methylstyrene resin represented by the aforementioned general formula (I) is preferably not less than 5 and more preferably not less than 10. If the number-average polymerization degree n is less than 5, lowering of the mechanical strength of resin compositions tends to occur. The number-average polymerization degree n is preferably not more than 5,000 and more preferably, not more than 4,000. If the number-average polymerization degree exceeds 5,000, lowering of the fluidity of such resin compositions tends to occur.

Further, X in the general formula (I) is preferred to be a bromine atom for improved flame retardance. Also m is preferred to be 2–3.

The halogen content of the halogenated polystyrene resin or halogenated polyα-methyl styrene resin is preferably not less than 20% by weight and more preferably not less than 25% by weight. If the halogenation rate is less than 20% by weight, insufficient flame retardance tends to take place.

The halogenated polystyrene resins or halogenated polyα-methylstyrene resins are compounds whose skeleton is as represented by the formula (I) but, if necessary, those may be copolymers made by copolymerizing monomers and/or polymers copolymerizable with such compounds and/or monomers thereof. As such copolymerizable monomer, there are included vinyl-type monomers and specific examples thereof include styrene, α-methylstyrene, acrylonitrile, methyl acrylate, ethyl acrylate, butyl acrylate, methyl methacrylate, ethyl methacrylate, butyl methacrylate, N-phenyl maleimide, butadiene and vinyl acetate, which may be used either alone or in combination of two or more. The proportion of such comonomers is preferably not more than 20% by weight and more preferably not more than 15% by weight.

As specific examples of the aforementioned halogenated epoxy compounds or resins, there are included halogenated bisphenol epoxy compounds or resins represented by the general formula (II) below:

The halogenation rate of the aforementioned halogenated bisphenol epoxy compounds or resins is preferably not less than 10% by weight, more preferably not less than 20% by weight and still more preferably not less than 25% by weight. If the halogenation rate is less than 10% by weight, it is unpreferable due to insufficient flame retardance.

The number-average polymerization degree i of the aforementioned halogenated bisphenol epoxy resins is preferred to be less than 12.

Further, at least one of a plurality of X is preferable to be a bromine atom for improved flame retardance. It is more preferable if the plurality of X are all bromine atoms. In the general formula (II), Y is preferred to be —C(CH$_3$)$_2$— for the desired mechanical strength.

As specific examples of the aforementioned halogenated phenoxy resins, there are included halogenated bisphenol-type phenoxy resins represented by the following formula (III).

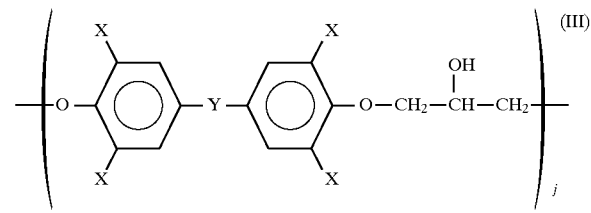

where at least one of a plurality of X is a halogen atom and the other are hydrogen atoms or halogen atoms, Y is alkylene groups of C1–C10, alkylidene groups cycloalkane groups carbonyl group, —O—, —S—, —SO$_2$— or direct bondage and j is a number-average polymerization degree.

The halogenation rate of the aforementioned halogenated bisphenol phenoxy resins is preferably not less than 30% by weight, more preferably not less than 40% by weight and still more preferably not less than 45% by weight. If the halogenation rate is less than 30% by weight, it is unpreferable due to insufficient flame retardance.

The number-average degree of polymerization j of the halogenated bisphenolph epoxy resins is preferably not less than 12, more preferably not less than 13 and still more preferably not less than 15.

Further, in the general formula (III), at least one of X is desired to be a bromine atom for improved flame retardance. More preferably, X represents all bromine atoms. In the general formula (III), Y is desired to be —C(CH$_3$)$_2$— for improved mechanical strength.

The end group of the aforementioned halogenated bisphenol phenoxy resin is generally glycidyl groups and/or hydroxyl groups. Such end groups may be blocked by one or more compounds selected from the group consisting of carboxylic acids, phenols, amines and alcohols.

The amount of the halogen flame retardant used is only required to be enough to make the aforementioned polyeth-

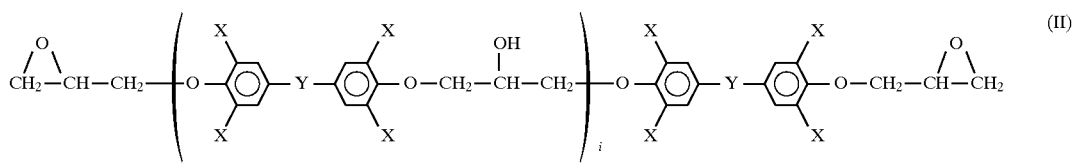

where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$— or direct bondage, and i is a number-average polymerization degree.

ylene terephthalate resin flame-retardant and generally 1–60 parts by weight per 100 parts by weight of the polyethylene terephthalate resin and more preferably 5–45 parts by weight. If this amount is less than 1 part by weight, no sufficient flame retardance can be hoped for, while it is more than 60 parts by weight, it results in lowering of the mechanical strength of the resin composition.

In this invention, at least one compound selected from the group consisting of epoxy compounds having at least 2 epoxy groups in the molecule and carbodiimide compounds (C) primarily for the improvement of the wet heat resistance.

As specific examples of epoxy compounds, there are included bisphebnol-type epoxy resins, novolak-type epoxy resins, multi-valent aliphatic, alicyclic, and aromatic glycidyl ether compounds, multivalent aliphatic, alicyclic and aromatic glycidyl ether compounds, alicyclic, alicyclic and aromatic glycidyl ester compounds, epoxy compounds made by epoxidizng aliphatic or alicyclic compounds each having a plurality of unsaturated groups with acetic acid and peracetic acid, multivalent aliphatic, alicyclic and aromatic glycidyl amine compounds. Such compounds may be those containing or not containing halogen atoms.

As specific examples of the aforementioned epoxy compounds, there are included bisphenol A-type epoxy resins not containing halogen atoms, as represented by the general formula (IV) below:

diglycidyl ether, diglycidyl terephthalate, diglycidyl isophthalate, diglycidyl adipate, diglycidyl aniline, tetraglycidyl 4,4'-diaminodiphenyl methane, triglycidyltris (2-hydroxyethyl) isocyanurate and polyepoxides of higher oils and fats, halogenated epoxy-type compounds including, for example, halogenated bisphenol-type epoxy compounds or resins represented by the formula (VI) below:

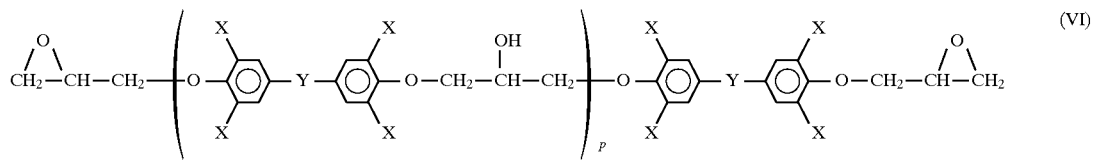
(VI)

where at least one of a plurality of X is a halogen atom and the other are hydrogen atoms or halogen atoms, Y is alkylene group of C1–C10, alkylidene group, cycloalkane group, carbonyl groups, —O—, —S—, —SO$_2$— or direct bondage, and p is a number-average polymerization degree, and dibromoneopentyl glycol diglycidyl ether. Of the aforementioned epoxy compounds, especially preferred are bisphenol A-type epoxy resins, novolak-type epoxy resins, halogenated bisphenol A-type epoxy compounds or resins.

These may be used either alone or in combination of two or more.

The aforementioned carbodiimide compound is a compound having at least one carbodiimide group (—N=C=N—) and this compound can be produced by

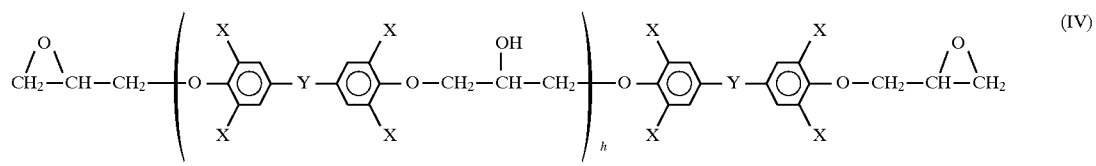
(IV)

where X is a hydrogen atom, Y is —C(CH$_3$)$_2$— and h is a number-average polymerization degree of 0–20 in real number, and novolak-type epoxy resins represented by the general formula (V) below:

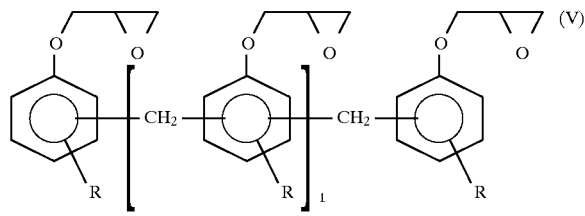
(V)

where R is hydrogen or methyl group and l is an average polymerization degree of 1–40 in real number, epoxy compounds not containing halogen atoms including, for example, alkylene glycol diglycidyl ethers such as ethylene glycol diglycidyl ether, propylene glycol diglycidyl ether, tetramethylene glycol diglycidyl ether, neopentyl glycol diglycidyl ether and 1,6-hexanediol diglycidyl ether; polyalkylene glycol diglycidyl ethers such as polyethylene glycol diglycidyl ether, polybutanediol diglycidyl ether, polypropylene glycol diglycidyl ether, polyneopentyl glycol diglycidyl ether and polytetramethylene glycol diglycidyl ether; resorcindiglycidyl ether, erythrite polyglycidyl ether, trimethylolpropane polyglycidyl ether, pentaerythritol polyglycidyl ether, hydroquinonediglycidyl ether, diglycerol polyglycidyl ether, polyglycerol polyglycidyl ether, sorbitan polyglycidyl ether, sorbitol polyglycidyl ether, bisphenol S decarboxylation by heating organic isocyanates in the presence of a suitable catalyst. As examples of the carbodiimide compounds, there are included mono- or di-carbodiimide compounds such as diphenyl carbodiimide, dicyclohexyl carbodiimide, di-2,6-dimethylphenyl carbodiimide, diisopropyl carbodiimide, dioctyldecyl carbodiimide, di-o-tolylcarbodiimide, N-tolyl-N'-phenyl carbodiimide, N-tolyl-N'-cyclohexyl carbodiimide, di-p-tolylcarbodiimide, di-p-nitrophenyl carbodiimide, di-p-aminophenyl carbodiimide, di-p-hydroxyphenyl carbodiimide, di-p-chlorophenyl carbodiimide, di-dichlorophenyl carbodiimide, di-3,4-dichlorophenyl carbodiimide, di-2,5-dichlorophenyl carbodiimide, p-phenylene-bis-o-tolylcarbodiimide, p-phenylene-bis-dicyclohexyl carbodiimide, p-phyenylene-bis-di-p-chlorophenyl carbodiimide, hexamethylene-bis-dicyclohexyl carbodiimide, ethylene-bis-diphenyl carbodiimide and ethylene-bis-di-cyclohexyl carbodiimide; polycarbodiimides such as poly(1,6-hexamethylene carbodiimide), poly(4,4'-methylene-bis-cyclohexyl carbodiimide), poly(1,3-cyclohexylene carbodiimide, and poly(1,4-cyclohexylene carbodiimide); and aromatic polycarbodiimides such as poly(4,4'-diphenylmethane carbodiimide), poly(3,3'-dimethyl-4,4'-diphenylmethane carbodiimide), poly(naphtylene carbodiimide), poly(p-phenylene carbodiimide), poly(m-phenylene carbodiimide), poly(tolylcarbodiimide), poly(diisopropylphenylene carbodiimide), poly(methyl-diisopropylphenylene carbodiimide), poly(triethylphenylene carbodiimide) and poly(triisopropylphenylene carbodiimide). As commercial available products, there are Bayer AG.'s STABAXOL I and STABAXOL P. The aforementioned carbodiimide compounds may be used either alone or in combination of two or more.

Such epoxy and carbodiimide compounds (C) may be used either alone or in combination of two or more. The amount to be added varies depending on the kind of the compound, the number of functional groups, the molecular weight etc., but generally 0.05–20 parts by weight and preferably 0.1–15 parts by weight per 100 parts by weight of the polyethylene terephthalate resin. If the amount added is less than 0.05 parts by weight, the wet heat resistance of resin composition is insufficient, while, if it exceed 20 parts by weight, moldability and mechanical strength are deteriorated.

The resin compositions of the present invention may further contain antimony compounds (D) for the improvement of their flame retardance. As the antimony compounds, there are included, for example, antimony trioxide, antimony tetraoxide, antimony pentoxide, sodium antimonate and antimony phosphate. Although these are used either alone in combination of two or more, especially preferred are antimony oxides and/or sodium antimonate for improved mechanical strength.

The amount to be added of the aforementioned antimony compound is approx. 0.1–20 parts by weight and preferably 1–15 parts by weight per 100 parts by weight of the polyethylene terephthalate resin. If the amount added is less than 0.1 part by weight, the flame retardance is insufficient, while, if it exceed 20 parts by weight, the mechanical strength of the resin composition is deteriorated.

The flame retardant polyethylene terephthalate resin composition of the present invention encompasses compositions further including an enforcing filler (E), that is, reinforced flame retardant polyethylene terephthalate resin compositions. As the reinforcing fillers, there are included, for example, glass fiber, carbon fiber, potassium titanate fiber, glass beads, glass flakes, calcium carbonate, calcium sulfate and barium sulfate, which are used alone or in combination of two or more. As the enforcing fillers, preferred are fibrous ones such as glass fiber and carbon fiber and, with workability taken into consideration, it is most advisable to use chopped strand glass fiber treated with a binder. Also, for enhancing adhesion of a fibrous reinforcing agent to a resin, it is advisable to treat the surface of a fibrous reinforcing agent with a coupling agent, which may further be treated with a binder.

As the aforementioned coupling agents, alkoxysilane compounds such as γ-aminopropyl triethoxysilane and γ-glycidoxypropyl trimethoxysilane are preferred and as the binders, epoxy resins and urethane resins are preferred but these are not limited thereto.

When glass fiber is used as the reinforcing agent, it is preferable to be 1–20 μm in diameter and 0.01–50 mm in length. If such fiber is too short, the reinforcing effect is not sufficient, while, if it is too long, the surface characteristic of the molded article will be deteriorated as well as its extrusion and molding characteristics.

The amount to be added of the reinforcing filler is up to 150 parts by weight per 100 parts by weight of the polyethylene terephthalate resin, preferably 2–120 parts by weight and more preferably 5–100 parts by weight. If the amount of the reinforcing filler exceeds 150 parts by weight, deterioration in extrusion as well as molding characteristics takes place.

In the second aspect of the present invention, (A) a polyethylene terephthalate resin whose principal structural constituent is ethylene terephthalate units produced by the use of a germanium catalyst, (D) an antimony compound and (E) a reinforcing filler and amounts to be added are essentially same as given in the first aspect of the present invention.

The halogen flame retardant (B') having two or more epoxy groups in molecule used in the second aspect of the present invention is used for the simultaneous improvement of flame retardance and wet heat resistance provided by the constituent (B) and the constituent (C) in the first aspect of the present invention. Specific examples of the halogen flame retardant include halogenated bisphenol-type epoxy compounds or resins represented by the general formula (VII):

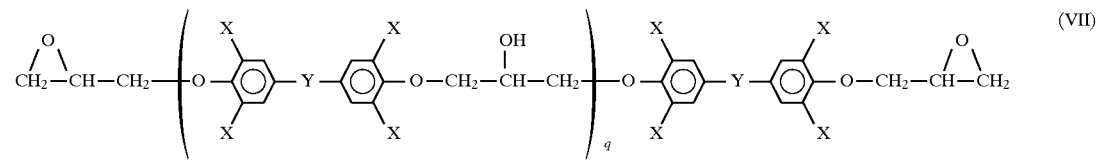

(VII)

where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$—, or direct bondage and q is a number-average polymerization degree.

The halogenation rate of the halogenated bisphenol-type epoxy resin is not less than 10% by weight preferably not less than 20% by weight and still more preferably not less than 25% by weight. If the halogenation rate is less than 10% by weight, it is not preferable for insufficient flame retardance.

The epoxy equivalent of the halogenated bis-phenol-type epoxy resin is preferred to be in a range of 700–6,000. If the epoxy equivalent is less than 700, lowering of flowability is likely caused, while, if it is in excess of 6,000, lowering of wet heat resistance is likely caused.

In the general formula (VII), it is preferable for flame retardance if at least one of a plurality of X is a bromine atom. More preferably, all X are bromine atoms. Further, Y in the general formula (VII) is preferably —C(CH$_3$)$_2$— with respect to the mechanical strength.

In the second aspect of the present invention, the amount required of the halogenated flame retardant (B') having two or more epoxy groups in its molecule is enough for flame retardance of the polyethylene terephthalate resin although it depends on the halogenationrate, molecular weight etc., generally being 1–60 parts by weight and preferably 5–55 parts by weight per 100 parts by weight of the polyethylene terephthalate resin. If the amount added is less than 1 weight part, both flame retardance and wet heat resistance are insufficient, while, if it exceeds 60 parts by weight, moldability and mechanical strength are deteriorated.

In the third aspect of the present invention, moldability meeting the demand of high-cycle molding such as injection molding, and releasability can be met by the use of at least one inorganic compound selected from the group consisting of silicates and silisic acid (F). Of the inorganic compounds, silicates are in powder, needle or plate form having $SiO_2$ in chemical composition, either natural or synthesized, including, for example, magnesium silicate, aluminum silicate, calcium silicate, talc, mica, wollastonite, kaolin, diatomaceous earth, bentonite and clay, preferred being talc, mica, kaolin and wollastonite. These inorganic compounds may be used alone or in combination of two or more.

The amount to be added of these inorganic compounds are 0.1–60 parts by weight per 100 parts by weight of the polyethylene terephthalate resin, preferably 1–50 parts by weight and more preferably 2–40 parts by weight. If the amount added is less than 0.1 part by weight, the improvement in moldability and releasability is insufficient, while, if it exceeds 60 parts by weight, the mechanical strength of the resin composition is deteriorated.

The flame retardant polyethylene terephthalate resin composition is further improved in releasability as well as surface gloss of molded articles, by the addition of (G) a crystallization accelerator, these effects being especially marked when the mold temperature is low.

As the crystallization accelerators, there are included, for example, polyalkylene glycols such as polyethylene glycols, polypropylene glycols and block and/or random copolymers of poly(ethylene oxide.propylene oxide), polytetramethylene glycols, bisphenol-ethylene oxide addition polymers, bisphenol-propylene oxide addition polymers and bisphenol-tetrahydrofuran addition polymers or their modifications having end-epoxy or end-ester groups, aliphatic polyesters such as poly-ε-caprolactones, polyester oligomers such as polyethylene terephthalates, polypropylene terephthalates, polytetramethylene terephthalates, polyhexamethylene terephthalates, polyethylene naphthalates, polybutylene naphthalates and polycyclohexanedimethylene terephthalates, or polyester-polyether copolymers, whose polyether unit has a molecular weight of not less than 400, having a glass transition temperature lower than that of the polyethylene terephthalate resin, represented by the following formula

where $R^1$ is an alkyl group 2–5 in carbon number, k is an integer of not less than 5 and k pieces of $R^1$ may or may not be the same,
and/or by the general formula (IX) below

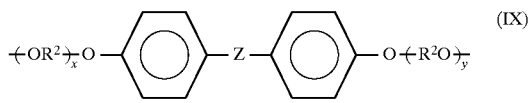

where $R^2$ is an alkyl group 2–5 in carbon number, Z is a bivalent bonding group or direct bondage, x and y are integers of not less than one respectively and x+y is an integer of not less than 3, and x and y pieces of $R^2$ may or may not be the same, polyester-aliphatic polyester copolymers lower in glass transition temperature than that of the polyethylene terephthalate resin such as polyethylene terephthalate-poly-ε-caprolactone copolymers and polytetramethylene terephthalate-poly-ε-caprolactone copolymers, plasticizers such as neopentylglycol dibenzoate, dioctyl phthalate, triphenyl phosphate, butane-1,3-dioladipate oligomers, butane-1,4-dioladipate oligomers, hexane-1,6-dioladipate oligomers, dibutyl sebacate and dioctyl sebacate, which may be used either alone or in combination of two or more. It is not advisable to use a metallic salt of an organic or high-molecule carboxylic acid, as wet heat resistance and fluidity lower.

Of the aforementioned crystallization accelerator, the polyester-polyether copolymers are preferable for their high mechanical strength, heat resistance and anti-blooming behavior.

As the polyester unit of the aforementioned copolymers, a polyalkylene terephthalate unit, whose principal structural constituent is ethylene terephthalate and/or tetramethylene terephthalate, is preferable with regard to mechanical strength, fluidity and release property.

The polyether units are those represented in the general formula (VIII) and/or the general formula (IX) and specific examples of R' in the general formula (VIII) are groups of ethylene, propylene, isopropylene and tetramethylene and specific examples of $R^2$ in the general formula (IX)] are groups of ethylene, propylene, isopropylene and tetramethylene, and as specific examples of Z are such bivalent groups such as —C(CH$_3$)$_2$—, —CH$_2$—, —S—, —SO$_2$— and —CO— or direct bondage.

Further, in the polyether unit, k in the general formula (VIII) is an integer of 5 or more and x and y in the general formula (IX) are integers of 1 or more and x+y is 3 or more, whose molecular weight is 400 or more. The molecular weight of the polyether unit is more preferably 600–6,000 and still more preferably 800–3,000. When the molecular weight is less than 400, the effect of improving the releasability of a flame retardant resin composition and the surface gloss of a molded article is small, while, if it exceed 6,000, it becomes difficult to obtain a uniform polymer to thus result in a drop of the mechanical strength.

As specific examples of the aforementioned polyether units, there are included residual groups of polyethylene glycols, polypropylene glycols, polytetramethylene glycols, poly(ethylene oxide.polypropylene oxide) copolymers, addition polymers of bisphenols such as bisphenol A or bisphenol S, and alkylene oxides such as ethylene oxide, propylene oxide and tetrahydrofuran.

These are usable either alone or in combination of two or more but especially when more than one kind of polyether unit represented by the general formula (IX) are used, heat stability, releasability of a molded article of the resulting flame retardant resin composition when the temperature of the mold used is low and the surface characteristics of a molded article are markedly improved. Of these, ethylene oxide addition polymers of bisphenol A, propylene oxide addition polymers of bisphenol A, tetrahydrofuran addition polymers of bisphenol A, ethylene oxide.propylene oxide addition polymers of bisphenhol A, ethylene oxide addition polymers of bisphenol S, propylene oxide addition polymer of bisphenol S, tetrahydrofuran addition polymers of bisphenol S, and ethylene oxide.propylene oxide addition polymers of bisphenol S are preferable.

The amount copolymerized of the polyether unit is 3–60% by weight, preferably 20–55% by weight and more preferably 25–50 weight % by weight per 100% by weight of the copolymer obtained. If it is less than 3% by weight, the releasability and the surface gloss of a molded article are insufficient, while, if it exceeds 60% by weight, the mechanical strength and the wet heat resistance tend to be deteriorated.

The intrinsic viscosity of such copolymers is 0.30–2.00 dl/g, preferably 0.40–1.80 dl/g and more preferably 0.50–1.50 dl/g. If the intrinsic viscosity is less than 0.35 dl/g, the heat resistance of the resultant flame retardant resin composition tends to lower, if it exceeds 2.00 dl/g, dispersibility lowers and the mechanical strength of the resulting flame retardant resin composition tends to lower.

The amount to be added of the aforementioned crystalline accelerator varies according to the kind of the crystalization accelerator and its molecular weight, but generally 0.05–50 parts by weight per 100 parts by weight of the polyethylene terephthalate resin. When the crystalline accelerator used is low in molecular weight such as polyalkylene glycols, aliphatic polyesters and plasticizers, the amount needed is 0.05–30 parts by weight and in the case of polyester-polyether copolymers or polyester oligomers, polyester-aliphatic polyester copolymer or the like, it is 0.5–50 parts by weight. Further, the amount to be added to polyester-polyether copolymer is preferably 1–40 parts by weight and more preferably 2–35 parts by weight. If the amount to be added is less than the lower limit of the aforementioned range, the releasability and surface gloss of a molded article is insufficient if the mold temperature is low, and it is not favorable either if the upper limit is exceeded become the mechanical strength, heat resistance, wet heat resistance of the resulting resin composition are deteriorated.

(E) 0–150 parts by weight of a reinforcing filler.

The flame retardant polyethylene terephthalate resin composition of the aforementioned composition is preferred for its improved wet heat resistance without deterioration of the mechanical strength and fluiedity. However, if the constiuent (C) is excessive, the mechanical strength of a molded article or its surface appearance tend to be deteriorated.

Embodiment 3

A flame retardant Polyethylene terephthalate resin composition comprising:

(A) 100 parts by weight of a polyethylene terephthalate resin with ethylene terephthalate units as a principal constituent, produced by the use of a germanium compound as a catalyst, (B) 1–60 parts by weight of a halogenated bisphenol-type epoxy resin whose skeleton is as represented by the general formula (X) below, whose halogenation rate is not less than 10% by weight and whose softening point is 85°–195° C.,

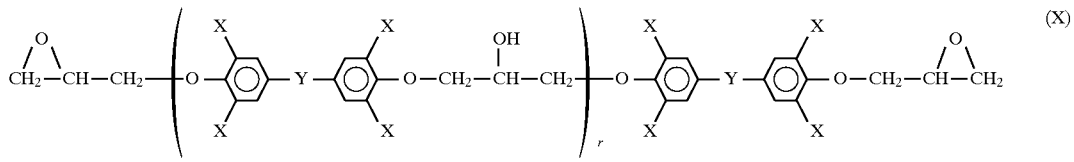

In this invention involving the aforementioned constituents, the following resin compositions may be given as preferable embodiments.

Embodiment 1

A flame retardant polyethylene terephthalate resin composition comprising:

(A) 100 parts by weight of a polyethylene terephthalate resin with ethylene terephthalate units as a principal constituent, produced by the use of a germanium compound as a catalyst, (B) 1–60 parts by weight of at least one selected from the group consisting of halogenated polystyrene resins and halogenated polyα-methylstyrene resins, represented by the above general formula(I), (C) 0.05–20 parts by weight of an epoxy compound having at least 2 epoxy groups in the molecule, (D) 0.1–20 parts by weight of an antimony compound, and (E) 0–150 parts by weight of a reinforcing filler.

The flame retardant polyethylene terephthalate resin composition of the aforementioned composition is excellent in flame retardance and wet heat resistance, prevents lowering of mechanical strength and fuidity caused by the addition of the constituent (B) above, and further improves appearance of a molded article.

Embodiment 2

A flame retardant Polyethylene terephthalate resin composition comprising:

(A) 100 parts by weight of a polyethylene terephthalate resin with ethylene ethylene terephthalate units as a principal constituent, produced by the use of a germanium compound as a catalyst, (B) 1–60 parts by weight of at least one selected from the group consisting of halogenated polystyrene resins and halogenated polyα-methylstyrene resins, represented by the above general formula (I), (C) 0.05–20 parts by weight of a carbodiimide compound, (D) 0.1–20 party by weight of an antimony compound, and where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$— or direct bondage and r is a number-average polymerization degree being less than 12 in real number, (C) 0.05–20 parts by weight of an epoxy compound having 2 or more epoxy groups in the moleucle and not containing halogen atoms, (D) 0.1–20 parts by weight of an antimony compound, and (E) 0–150 parts by weight of a reinforcing filler.

The flame retardant resin composition of the aforementioned composition is preferred for its excellent mechanical strength, heat stability and surface appearance of a molded article, being also improved in wet heat resistance. If, however, the softening point of the constituent (B) is too low, its mechanical strength and surface appearance of a molded article tend to become lower and, if it is too high, the surface appearance and wet heat resistance tend to become lower.

Embodiment 4

A flame retardant Polyethylene terephthalate resin composition comprising:

(A)100 parts by weight of a polyethylene terephthalate resin with ethylene ethylene terephthalate units as a principal constituent, produced by the use of a germanium compound as a catalyst, (B) 1–60 parts by weight of a halogenated bisphenol-type epoxy resin whose skeleton is as represented by the above general formula (X), whose halogenation rate is not less than 10% by weight and whose softening point is 85°–195° C., (C) 0.05–20 parts by weight of a carbodiimide compound, (D) 0.1–20 parts by weight of an antimony compound, and (E) 0–150 parts by weight of a reinforcing filler.

The flame retardant resin composition of the aforementioned composition is preferred for preventing lowering of its fluidity caused by the addition of the constituent (B), excelled in mechanical strength, fluidity and surface appearance of a molded article, being also improved in wet heat resistance. If the softening point of the constiuent (B) is too low, however, its mechanical strength and surface appearance of a molded article tend to become lower and, if it is too high, the surface appearance and wet heat resistance tend to become lower.

Embodiment 5

A flame retardant Polyethylene terephthalate resin composition comprising:
- (A) 100 parts by weight of a polyethylene terephthalate resin type with ethylene terephthalate units as a principal constituent, produced by the use of a germanium compound as a catalyst,
- (B) 1–60 parts by weight of a halogenated bisphenol-type phenoxy resin of high molecular weight whose skeleton is as represented by the general formula (XI) below, whose halogenation rate is not less than 30% by weight;

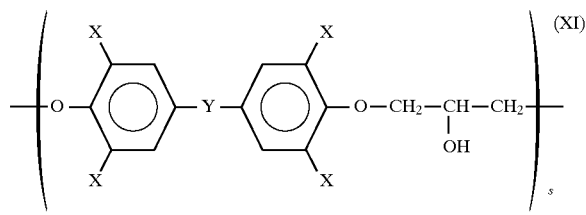

where at least one of a plurality of X is a halogen atom and the other are hydrogen atoms or halogen atoms, Y is alkylene group, alkylidene group of C1–C10, cycloalkane group, carbonyl group, —O—, —S—, —SO$_2$— or direct bondage and s is a number-average polymerization degree being not less than 12 in real number.
- (C) 0.05–20 parts by weight of an epoxy compound having two or more epoxy groups in the molecule and not containing halogen groups,
- (D) 0.1–20 parts by weight of an antimony compound; and
- (E) 0–150 parts by weight of a reinforcing filler.

The flame retardant resin composition of the aforementioned composition is preferred for its high wet heat resistance and its sufficiently high flame retardance even when molded into a thin-wall molded article of, for example, 1/32 inch in thickness. However, if the number-average polymerization degree of the constituent (B) is small, flame retardance may occasionally be insufficient in the case of a thin-wall molded article.

Embodiment 6

A flame retardant Polyethylene terephthalate resin composition comprising:
- (A) 100 parts by weight of a polyethylene terephthalate resin with ethylene terephthalate units as a principal constituent produced by the use of a germanium compound as a catalyst,
- (B) 1–60 parts by weight of a halogenated bisphenol-type phenoxy resin of high molecular weight whose skeleton is as represented by the above general formula (XI), whose halogenation rate is not less than 30% by weight,
- (C) 0.05–20 parts by weight of a carbodiimide compound,
- (D) 0.1–20 parts by weight of an antimony compound, and
- (E) 0–150 parts by weight of a reinforcing filler.

The flame retardant resin composition of the aforementioned composition is preferred for its high wet heat resistance and its sufficiently high flame retardance even when molded into thin-wall article. However, if the number-average polymerization degree of the constituent (B) is small, flame retardance may occasionally be insufficient in the case of a thin-wall molded article.

Embodiment 7

A flame retardant Polyethylene terephthalate resin composition comprising:
- (A) a polyethylene terephthalate resin whose principal structural constituent is ethylene terephthalate units, produced by the use of a germanium compound as a catalyst,
- (B) a halogenated polystyrene resin represented by the aforementioned general formula (I),
- (C) a halogenated epoxy compound whose skeleton is as represented by the general formula (XII) below, whose halogenation rate is not less than 10% by weight and whose epoxy equivalent is not less than 700 and not more than 2,500,

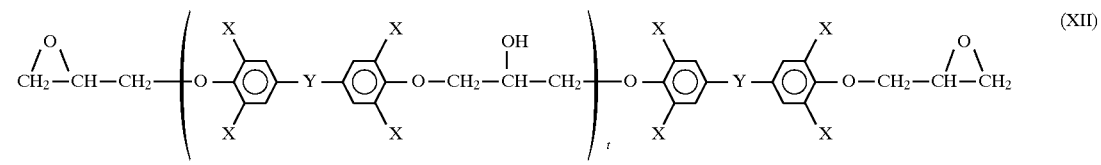

where at least one of a plurality of X is a halogen atom, Y is alkylene group of C1–C10, alkylidene group, cycloalkane group, carbonyl group, —O—, —S—, —SO$_2$— or direct bondage and t is a number-average Polymerization degree,
- (D) an antimony compound, and
- (E) a reinforcing filler, wherein the total amount of the constituent (B) and the constituent (C) is 5–50 parts by weight, the weight ratio of (B)/(C) is 80/20–5/95, the amount of the constituents (C) is not less than 4 parts by weight, the amount of the constituent (D) is 0.1–20 parts by weight and the amount of the constituent (E) is 0–150 parts by weight, per 100 parts by weight of the resin (A).

The flame retardant resin composition of the aforementioned composition is preferred for its high flame retardance, wet high resistance, fluidity and surface appearance of a molded article. If, however, the epoxy equivalent is too small, moldability tends to become lower and, if it is too large, the wet heat resistance is deteriorated.

Embodiment 8

A flame retardant Polyethylene terephthalate resin composition comprising:
- (A) a polyethylene terephthalate resin with ethylene terephthalate units as a principal constituent, produced by the use of a germanium compound as a catalyst,
- (B) a halogenated phenoxy resin whose skeleton is as represented by the general formula (XIII) below:

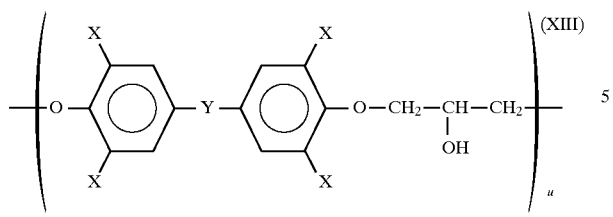

(XIII)

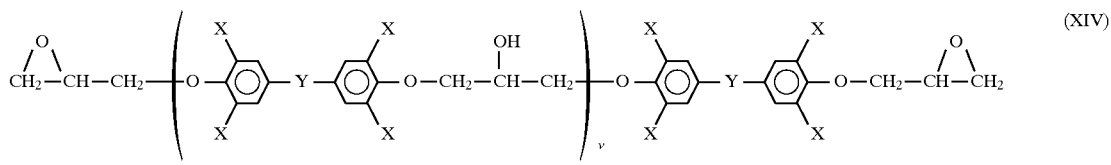

(XIV)

where at least one of a plurality of X is a halogen atom, Y is alkylene group of C1–C10, alkylidene group, cycloalkane group, carbonyl group, —O—, —S— or —SO$_2$— and u is a number-average degree of polymerization being not less than 12 and not more than 150, whose halogenation ratio is not less than 30% by weight and whose epoxy equivalent is not less than 4,000, (C) a halogenated epoxy compound with its skeleton as represented by the following general formula (XIV)

where at least one of a plurality of X is a halogen atom, Y is alkylene group of C1–C10, alkylidene group, cycloalkane group, carbonyl group, —O—, —S— or —SO$_2$— and v is an average polymerization degree, whose halogenation degree is not less than 10% by weight and whose epoxy equivalent is not less than 800 and not more than 2,500, (D) an antimony compound, and (E) a reinforcing filler, wherein the total amount of the constituent (B) and the constituent (C) is 5–50 parts by weight, the weight ratio of (B)/(C) is 90/10–1/99, the amount of the constituent (C) is not less than 3 parts by weight, the amount of the constituent (D) is 0.1–20 parts by weight and the amount of the constituent (E) is 0–150 parts by weight, per 100 parts by weight of the resin (A).

The flame retardant resin composition of the aforementioned composition is preferred for its high flame retardance and high wet heat resistance with no deterioration of mechanical strength. If, however, the epoxy equivalent is too small, moldability tends to become lower and, if it is too large, the resistance to wet heat resistance is deteriorated.

Embodiment 9

A flame retardant Polyethylene terephthalate resin composition comprising:

(A) 100 parts by weight of a polyethylene terephthalate resin with ethylene terephthalate units as a principal constituent produced by the use of a germanium compound as a catalyst, (B') 1–60 parts by weight of a halogenated epoxy compound whose skeleton is as represented by the general formula (XV) below, whose halogenation rate is not less than 10% by weight and whose epoxy equivalent is not less than 1,500 and not more than 6,000,

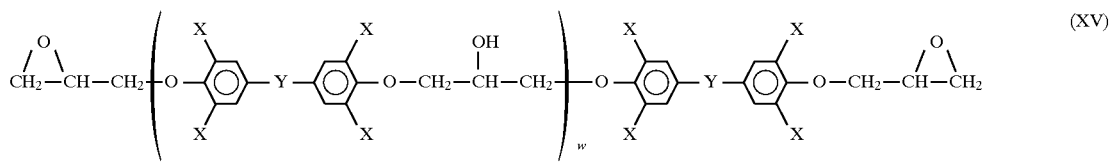

(XV)

where at least one of a plurality of X is a halogen atom, Y is alkylene group, alkylidene group of C1–10, cycloalkane group, carbonyl group, —O—, —S—, —SO$_2$— or direct bondage and w is a number-average polymerization degree, (D) 0.1–20 parts by weight of an antimony compound, and (E) 0–150 parts by weight of a reinforcing filler.

The flame retardant resin composition of the aforementioned composition is preferred for its high flame retardance, high wet heat resistance and good fluidity. If the epoxy equivalent is too small, moldability tends to be lowered and, if it is too large, wet heat resistance tends to be lowered.

It is preferable that addition of 0.1–60 parts by weight of (F) one or more inorganic compounds selected from the group of silicates and silicic acid to the aforementioned combinations helps improve the moldability and releasability, well meeting the demand of high-cycle molding such as injection molding.

Further preferable is addition of 0.5–50 parts by weight of (G) a crystallization accelerator, especially a polyester-polyether copolymer, which is effective for improving releasability and surface gloss even when molding is made by the use of a mold having a low temperature.

The flame retardant polyethylene terephthalate resin also allows, if necessary, addition of heat stabilizers such as antioxidants. As such stabilizer, these are included, for example, phenol-type antioxidants such as pentaerythritol-tetrakis [3-(3,5-di-t-butyl-4-hydroxyphenyl)propionate], octadecyl-3-(3,5-di-t-butyl-4-hydroxyphenyl)propionate, 1,3,5-trimethyl-2,4,6-tris (3,5-di-t-butyl-4-hydroxybenzyl) benzene, n-octadecyl-3-(3',5'-di-t-butyl-4'-hydroxyphenyl) propionate, N,N'-bis-3-(3',5'-di-t-butyl-4-hydroxyphenyl) propionyl hexamethylenediamine and tris-(3,5-di-t-butyl-4-hydroxybenzyl)isocyanurate; phosphorus-type antioxidants such as tris (2,4-di-t-butylphenyl)phosphite, distearyl pentaerythritol-di-phosphite and bis-(2,6-di-t-butyl-4-methylphenyl)pentaerythritol-di-phosphite; and thioether-type antioxidants such as distearyl-3,3'-thiodipropionate and pentaerythritol-tetrakis-(β-lauryl-thiopropionate), which may be used either alone or in combination of two or more.

The flame retardant polyethylene terephthalate resin compositions of the present invention may further well known and commonly used additives such as UV absorbents, photostabilizers, lubricants, release agents, plasticizers, nucleating agents, pigments, dyes, antistatic agents, dispersing agents, compatibility-improvers and antibacterial agents, either a lone or in combination of two or more. Other flame retardants, flame retarding auxiliaries and inorganic compounds may also be used as additives.

The flame retardant polyethylene terephthalate resin compositions of the present invention may further contain other thermoplastic or thermosetting resins such as saturated or unsaturated polyester resins other than polyethylene terephthalate resins, liquid crystal polyester resins, polyesterester elastomer resins, polyesterether elastomer resins, polyolefin resins, polyamide resins, polycarbonate resins, rubbery polymer reinforced styrene resins, polyphenylenesulfide resins, polyphenyleneether resins, polyacetal resins, polysulfone resins and polyarylate resins, either alone or in combination of two or more, but in allowable amounts lest the properties such as flame retardance, mechanical properties and moldability should be affected.

There is no particular limitation about the method of producing a flame retardant polyethylene terephalate resin of the present invention. The aforementioned constituents are, for example, mixed uniformly, the mixture being fed to a single screw or a multi-screw extruder and, after melting and mixing therein at 230°–330° C., it is cooled to provide pellets.

There is no particular limitation about the molding method for the flame retardant polyethylene terephthalate resin of the present invention, either, and any of the commonly used methods for molding of thermoplastic resins such as injection molding, blow-molding, extruding, sheet molding, roll molding, press molding and laminate molding method, and also melt casting method known for molding of film and thread.

The present invention will be described in greater detail regarding the examples given below, but is not limited thereby. Unless otherwise noted, "part" means "part by weight" and "%" means "% by weight" hereinafter.

[Method of evaluating fluidity]

A resin composition was first dried for 4 hours in a hot-air drier at 140° C. and the B-method flow (melt flow rate) was measured according to JIS K 7210 under conditions of 280° C. in cavity temperature and 5–15 min. in preheating time.

Fluidity evaluation condition 1: Preheating time 5 min.

Fluidity evaluation condition 2: Preheating time 10 min.

Fluidity evaluation condition 3: Preheating time 15 min.

(Method of evaluating physical properties)

A resin composition was first dried for 4 hours and then molded by a 50-ton injection molding machine under conditions of 270° C. in cylinder temperature and 120° C. in mold temperature and bar-like specimens ¼" thick (12 mm wide, 127 mm long), ¹⁄₁₆" thick (12 mm wide, 127 mm long), ¹⁄₃₂" thick (12 mm wide, 127 mm long) and ASTM #1 dumbbell were obtained for the following test of physical properties.

<Flame retardance>

The ¹⁄₁₆" bar specimen or ¹⁄₃₂" bar specimen was used and flame retardance was evaluated by the perpendicular combustion test method described in UL 94.

<Tensile strength>

A dumbbell tensile test was made according to ASTM D-638 and the maximum strength was determined.

<Bending strength>

A bending test was made by the use of the ¼" bar according to ASTM D-790 and the maximum strength was determined.

<Wet heat resistance>

The specimen (dumbbell or ¼" bar) was treated for 30 or 40 hours in a saturated and pressurized water vapor atmosphere at 121° C. and the tensile strength or bending strength was measured and strength retention % was determined through the comparison with the same sample before the treatment.

$$\text{Strength retention (\%)} = \frac{\text{Strength after wet heating}}{\text{Strength before wet heating}} \times 100(\%)$$

[Evaluation of appearance of molded articles]

<Appearance immediately after molding>

The surface of the bar and dumbbell was visually observed and evaluation was made according to the following criteria:

○: Good

Δ: Rather poor in gloss or somewhat sticky, or partly poor in gloss or partly sticky X: Poor in gloss or sticky <Appearance after heating>

The bar and dumbbell were heated for 2 or 4 hours in a hot-air circulating oven at 150° C., the dumbbell's surface was then observed visually and evaluation was made according to the following criteria:

Post-heating appearance evaluation condition 1: Heating for 2 hours

Post-heating appearance evaluation condition 2: Heating for 4 hours

○: Good

Δ: Rather poor in gloss, somewhat sticky, or partly poor in gloss and partly sticky, or white free matters (bleed-out matters) visible X: Poor in gloss, sticky, or white free matters rather visible

[Evaluation of releasability(required for high-cycle moldability]

¼ bars (12 mm wide, 127 mm long) were molded and evaluation was made of the shortest time (in seconds) required for obtaining a molded article free of push-out pin-induced dents, deformation or malformation and good in external appearance (limit cooling time). The shorter this limit cooling time, the superior the high-cycle moldability. In the test, the resin composition was dried for more than 4 hours at 140° C. and molding was conducted by the use of a 50-ton injection molding machine under conditions of 300° C. in cylinder temperature and 140° C. or 120° C. in mold temperature, and the cooling time only was varied with the injection pressure holding time kept constant.

Releasability evaluation condition 1: Mold temperature 140° C.

Releasability evaluation condition 2: Mold temperature 120° C.

[Evaluation of surface gloss]

After drying a resin composition for more than 4 hours at 140° C., flat plates (2 mm thick, 12 mm long and wide) were molded by the use of a 50-ton injection molding machine under conditions of 270° C. in cylinder temperature and 90° C. in mold temperature and the surface gloss was visually observed and evaluation was made according to the following criteria.

○: Good

Δ: Rather poor in gloss or partly poor in gloss

X: Bad in gloss

[Evaluation of discoloration during molding]

After drying a resin composition for more than 4 hours at 140° C., flat, plates 3 mm thick (150 mm wide, 120 mm long) were molded by the use of a 150-ton injection molding machine under conditions of 290° C. in cylinder temperature and 120° C. in mold temperature 20–80% of the maximum injection speed as injection velocity and checking was made for discoloration (yellowing).

[Compounds used in Examples, Comparative Examples and Reference Examples]

(A) Following compounds were used as a polyethylene terephthalate resin.

(A-1) Polyethylene terephthalate (1) having an intrinsic viscosity of 0.65 dl/g prepared by the use of germanium dioxide (A-2) Polyethylene terephthalate (2) having an intrinsic viscosity of 0.85 dl/g prepared by the use of germanium dioxide (A-3) Polyethylene terephthalate (3) having an intrinsic viscosity of 0.65 dl/g prepared by the use of antimony trioxide (A-4) Polyethylene terephthalate (4) having an intrinsic viscosity of 0.65 dl/g prepared by the use of titanium tetrabutoxide (A-5) Polyethylene terephthalate (5) having an intrinsic viscosity of 0.75 dl/g prepared by the use of germanium dioxide (A-6) Polyethylene terephthalate (6) having an intrinsic viscosity of 0.60 dl/g prepared by the use of germanium dioxide (A-7) Polyethylene terephthalate (7) having an intrinsic viscosity of 0.75 dl/g prepared by the use of antimony trioxide (B) Following compounds were used as a halogen-type flame retardant.

(B-1) Brominated polystyrene (PIROCHECK 68PB: manufactured by Nissan Ferro Organic Chemical Co., ltd., Bromine content 68%)

(B-2) Tetrabromobisphenol A-type epoxy resin (1) having a softening point of 130° C. measured by JIS K-7234 (Softening Point Test Method of Epoxy Resins) (Average polymerization degree abt. 3, Bromination rate abt. 50%)

(B-3) Tetrabromobisphenol A-type epoxy resin (2) having a softening point of 160° C. (Average polymerization degree abt. 6, Bromination rate abt. 50%)

(B-4) Tetrabromobisphenol A-type epoxy resin (3) having a softening point of 69° C. (Average polymerization degree abt. 0–1, Bromination rate abt. 48%)

(B-5) Brominated bisphenol A-type phenoxy resin (1) having a softening point of more than 200° C., an average polymerization degree of 12 and a bromination rate of abt. 50%

(B-6) Tetrabromobisphenol A-type phenoxy resin (2) having an average polymerization degree of abt. 52 and a bromination rate of abt. 50%

(B-7) Tetrabromobisphenol A-type phenoxy resin (3) having an average polymerization degree of abt. 16 and a bromination rate of abt. 50%

(B-8) Tetrabromobisphenol A-type epoxy resin (4) having an average polymerization degree of abt. 2 and a bromination rate of abt. 50%

(B-9) Halogenated polystyrene resin (2) having an average polymerization degree of abt. 600 and a bromine content of abt. 68%, prepared by brominating a polystyrene (B-10) Halogenated polystyrene resin (3) having an average polymerization degree of abt. 300 and a bromine content of abt. 59%, prepared by polymerizing dibromostyrene (B-11) Tetrabromobisphenol A-type phenoxy resin (4) having an average polymerization degree of abt. 16.4, a bromine content of abt. 52% and a epoxy equivalent of abt. 5250

(B-12) Tetrabromobisphenol A-type phenoxy resin (5) having an average polymerization degree of abt. 15.6, a bromine content of abt. 53% and a epoxy equivalent endcapped partially of abt. 55000

(B') Following compounds were used as a halogen-type flame retardant having at least 2 epoxy groups in the molecule. (B'-1) Tetrabromobisphenol A-type epoxy resin (9) having a bromination rate of abt. 50% and an epoxy equivalent of abt. 1810

(B'-2) Tetrabromobisphenol A-type epoxy resin (10) having a bromination rate of abt. 50% and an epoxy equivalent of abt. 2330

(B'-3) Tetrabromobisphenol A-type epoxy resin (11) having a bromination rate of abt. 50% and an epoxy equivalent of abt. 3500

(B'-4) Tetrabromobisphenol A-type epoxy resin (12) having a bromination rate of abt. 50% and an epoxy equivalent of abt. 5200

(B'-5) Brominated bisphenol A-type phenoxy resin (6) having a bromination rate of abt. 50% and not containing epoxy groups due to being endcapped (C) Following compounds were used as an epoxy compound or carbodiimide compound.

(C-1) Bisphenol A-type epoxy (EPIKOTE 828: manufactured by Yuka-Shell Epoxy Co., ltd., Epoxy equivalent 189); multi-functional epoxy compound (1)

(C-2) Novolac-type epoxy (EPIKOTE 157S70: manufactured by Yuka-Shell Epoxy Co., ltd., Epoxy equivalent 210); multi-functional epoxy compound (2)

(C-3) Aromatic polycarbodiimide (STABAXOL P: manufactured by Bayer A. G.)

(C-4) Tetrabromobisphenol A-type epoxy resin (5) having a number-average polymerization degree of 2.7, a bromine content of abt. 52% and an epoxy equivalent of abt. 2250

(C-5) Tetrabromobisphenol A-type epoxy resin (6) having a number-average polymerization degree of abt. 1.9, a bromine content of abt. 53% and an epoxy equivalent of abt. 1820

(C-6) Tetrabromobisphenol A-type epoxy resin (7) having a number-average polymerization degree of abt. 1.0, a bromine content of abt. 50% and an epoxy equivalent of abt. 1250

(C-7) brominated bisphenol A-type epoxy resin (8) having a number-average polymerization degree of abt. 0, a bromine content of abt. 20% and an epoxy equivalent of abt. 500

(D) Following compounds were used as a antimony-type compound.

(D-1) Antimony trioxide (ANTIMONY OXIDE C: manufactured by Sumitomo Kinzoku Kozan K. K.)

(D-2) Sodium antimonate (SUNEPOCK NA-1070L: manufactured by Nissan Chemical Co., Ltd.)

(D-3) Antimony pentoxide (SANAFLAME AM: manufactured by Sanuki Chemical Co., Ltd.)

(E) Following material was used as a reinforcing filler.

(E-1) Glass fiber (T-195H/PS, manufactured by Nippon Denki Glass K. K.)

(F) Following compounds were used as an inorganic compound.

(F-1) Talk (MICROACE K-1: manufactured by Nippon Talk K. K.)

(F-2) Mica (A-21S: manufactured by Yamaguchi Mica K. K.)

(F-3) Kaolin (SATINTON No. 5: manufactured by Engelhard Co., Ltd.)
(F-4) Wollastonite (NYAD 325: manufactured by Nyco Co.,Ltd.)
(F-5) Calcium silicate (reagent)
(F-6) Calcium carbonate (reagent)

In addition, following compounds were used as an antioxidant.

Thioether-type antioxidant; ADEKASTAB AO-412S: manufactured by Asahi Denka K. K.

Phenol-type antioxidant; ADEKASTAB AO-60: manufactured by Asahi Denka K. K.

Further, PTFE indicates a polytetrafluoroethylene resin (POLYFLON F104: manufactured by Daikin Kogyo K. K.)

In the following method, polyester-polyether copolymers as a crystallization accelerator were obtained

[REFERENCE EXAMPLE 1]

3500 g of a polyethylene terephthalate oligomer prepared by the use of germanium dioxide as a catalyst (average unit number of ethylene terephthalate abt. 5–8), 1500 g of an ethylene oxide addition polymer of bisphanol A, having an average molecular weight of abt. 1000, and 25 g of a phenol-type antioxidant (ADEKASTAB AO-60) were charged into a 10-litre autoclave (manufactured by Nippon Pressure Glass K. K.)and heated up to 290° C. with stirring under a nitrogen stream, then depressurized to not more than 133 Pa.

After reaching not more than 133 Pa, stirring was continued for 3 hours, and the autoclave was returned to normal pressure with nitrogen to terminate the polymerization, and thus a copolymer (1) was obtained. An intrinsic viscosity of the resultant copolymer was 0.7 dl/g.

[REFERENCE EXAMPLE 2]

3500 g of a polytetramethylene terephthalate (intrinsic viscosity 0.9 dl/g: manufactured by kanebo K. K.), 1500 g of an ethylene oxide addition polymer of bisphanol A, having an average molecular weight of abt. 1000, and 25 g of a phenol-type antioxidant were charged into a 10-litre autoclave (manufactured by Nippon Pressure Glass K. K.)and heated up to 260° C. with stirring under a nitrogen stream, then depressurized to not more than 133 Pa. After reaching not more than 133 Pa, stirring was continued for 3 hours, and the autoclave was returned to normal pressure with nitrogen to terminate the polymerization, and thus a copolymer (2) was obtained. An intrinsic viscosity of the resultant copolymer was 0.8 dl/g.

Examples 1–22 and Comparative Examples 1–12 of the resin composition shown as Embodiment 1 above will be given below.

[EXAMPLE 1]

(A-1) Polyethylene terephthalate (1) 100 parts by weight,
(B-1) Brominated polystyrene 20 parts by weight,
(C-1) Multi-functional epoxy compound (1) 2 parts by weight,
(D-1) Antimony trioxide 4 parts by weight,
were admixed and 0.3 parts by weight of a thioether-type antioxidant was further added. Those were stirred in Super mixer and then put into a hopper of a twin-screw extruder TEX44 manufactured by Nippon Seikosho K. K., having a barrel temperature of 260° C. Moreover, through a side feeder of the extruder, 52 parts by weight of (E-1) Glass fiber was fed and subjected to melt-extrusion to thus obtain a resin composition. The evaluated results are shown in Table 1.

[EXAMPLES 2–8]

Resin compositions having such compositions as shown in Table 1 were obtained in the same manner as in Example 1. The evaluated results are shown in Table 1.

[EXAMPLE 9]

(A-1) Polyethylene terephthalate (1) 100 parts by weight,
(B-1) Brominated polystyrene 20 parts by weight,
(C-1) Multi-functional epoxy compound (1) 2 parts by weight,
(D-1) Antimony trioxide 4 parts by weight,
(F-1) Talc 6 parts by weight,
were admixed and 0.3 parts by weight of a thioether-type antioxidant was further added. Those were stirred in Super mixer and then put into a hopper of a twin-screw extruder TEX44 manufactured by Nippon Seikosho K. K., having a barrel temperature of 260° C. Moreover, through a side feeder of the extruder, 50 parts by weight of (E-1) Glass fiber was fed and subjected to melt-extrusion to thus obtain a resin composition. The evaluated results are shown in Table 2.

[EXAMPLES 10–16]

Resin compositions having such compositions as shown in Table 2 were obtained in the same manner as in Example 9. The evaluated results are shown in Table 2. For easier comparison, the evaluated results of Example 1 are also shown.

[Comparative Examples 1–12]

Resin compositions were obtained in the same manner as in Examples 1 and 9, except that components were admixed in proportions as shown in Tables 3 and 4. The evaluated results are shown in Tables 3 and 4.

As apparent from the comparison of Tables 1, 2 for Examples and Tables 3, 4 for Comparative Examples, the resin compositions of the present invention are excellent in every respect of mechanical strength, wet heat resistance and flame retardancy, and further good in appearance of molded articles. Moreover, by the conjoint use of the specific class of inorganic compound (F), those are excellent in releasability, too.

[EXAMPLE 17]

(A-1) Polyethylene terephthalate (1) 100 parts by weight,
(B-1) Brominated polystyrene 20 parts by weight,
(C-1) Multi-functional epoxy compound (1) 2 parts by weight,
(D-1) Antimony trioxide 4 parts by weight,
(G) Copolymer (1) 10 parts by weight,
were admixed and 0.3 parts by weight of a thioether-type antioxidant was further added. Those were stirred in Super mixer and then put into a hopper of a twin-screw extruder TEX44 manufactured by Nippon Seikosho K. K., having a barrel temperature of 260° C. Moreover, through a side feeder of the extruder, 52 parts by weight of (E-1) Glass fiber was fed and subjected to melt-extrusion to thus obtain a resin composition. The evaluated results are shown in Table 5.

[EXAMPLES 18–22]

Resin compositions having such compositions as shown in Table 5 were obtained in the same manner as in Example 17. The evaluated results are shown in Table 5. For easier comparison, the evaluated results of Examples 1 and 8 are also shown.

As apparent from Table 5, by the addition of the copolymer (1) or (2), surface gloss is good even in the case of molding by the use of a low temperature mold.

TABLE 1

|  | Examples | | | | | | | |
|---|---|---|---|---|---|---|---|---|
|  | 1 | 2 | 3 | 4 | 5 | 6 | 7 | 8 |
| (A-1) Polyethylene terephthalate | 100 | 100 | 100 | 100 | 100 | — | — | — |
| (A-2) Polyethylene terephthalate | — | — | — | — | — | 100 | 100 | 100 |
| (B-1) PIROCHECK68PB | 20 | 20 | 20 | 20 | 35 | 20 | 20 | 20 |
| (C-1) EPIKOTE828 | 2 | — | 3 | — | 2 | 2 | 2 | — |
| (C-2) EPIKOTE157S70 | — | 2 | — | 4 | — | — | — | 2 |
| (D-1) Antimony trioxide | 4 | 4 | — | — | 4 | 4 | — | 4 |
| (D-2) Sodium antimonate | — | — | 4 | 4 | — | — | — | — |
| (D-3) Antimony pentoxide | — | — | — | — | — | — | 4 | — |
| (E-1) Glass fiber | 52 | 52 | 52 | 52 | 52 | 52 | 52 | 52 |
| Thioether-type antioxidant | 0.3 | 0.3 | 0.3 | 0.3 | 0.3 | 0.3 | 0.3 | 0.3 |
| Tensile strength (MPa) | 160 | 155 | 151 | 148 | 151 | 163 | 162 | 154 |
| Wet heat resistance [30 hr, tensileness] (%) | 76 | 81 | 75 | 85 | 74 | 79 | 77 | 86 |
| Flame retardancy (1/16 inch) | V-0 | V-0 | V-0 | V-0 | V-0 | V-0 | V-0 | V-0 |
| Surface appearance of molded article: Immediately after molding | ○ | ○ | ○ | ○ | ○ | ○ | ○ | ○ |

Wet heat resistance: test hour = 30 hrs, Evaluation = tensile strength
Surface appearance of molded articles: surface appearance immediately after molding

TABLE 2

|  | Examples | | | | | | | | |
|---|---|---|---|---|---|---|---|---|---|
|  | 9 | 10 | 11 | 12 | 13 | 14 | 15 | 16 | 1 |
| (A-1) Polyethylene terephthalate | 100 | 100 | 100 | 100 | 100 | — | — | — | 100 |
| (A-12) Polyethylene terephthalate | — | — | — | — | — | 100 | 100 | 100 | — |
| (B-1) PIROCHECK68PB | 20 | 20 | 20 | 20 | 30 | 20 | 20 | 20 | 20 |
| (C-1) EPIKOTE828 | 2 | — | — | 2 | — | 2 | 3 | — | 2 |
| (C-2) EPIKOTE157S70 | — | 2 | 3 | — | 2 | — | — | 2 | — |
| (D-1) Antimony trioxide | 4 | 4 | — | 4 | — | 4 | 4 | — | 4 |
| (D-2) Sodium antimonate | — | — | 4 | — | — | — | — | — | — |
| (D-3) Antimony pentoxide | — | — | — | — | 5 | — | — | 5 | — |
| (E-1) Glass fiber | 50 | 50 | 50 | 50 | 50 | 50 | 50 | 50 | 52 |
| (F-1) Talc | 6 | 6 | 6 | 10 | — | — | — | 6 | — |
| (F-2) Mica | — | — | — | — | 10 | — | — | — | — |
| (F-3) Kaolin | — | — | — | — | — | 10 | — | — | — |
| (F-4) Wollastonite | — | — | — | — | — | — | 10 | — | — |
| Thioether-type antioxidant | 0.3 | 0.3 | 0.3 | 0.3 | 0.3 | 0.3 | 0.3 | 0.3 | 0.3 |
| Tensile strength (MPa) | 159 | 153 | 148 | 156 | 149 | 152 | 150 | 151 | 160 |
| Wet heat resistance [30 hr, tensileness] (%) | 74 | 79 | 72 | 72 | 78 | 77 | 80 | 84 | 76 |
| Flame retardancy (1/16 inch) | V-0 | V-0 | V-0 | V-0 | V-0 | V-0 | V-0 | V-0 | V-0 |
| Surface appearance of molded articles: Immediatery after molding | ○ | ○ | ○ | ○ | ○ | ○ | ○ | ○ | ○ |
| Limit cooling time (sec) | 12 | 13 | 12 | 10 | 14 | 14 | 13 | 14 | 23 |

Wet heat resistance: test hour = 30 hrs, Evaluation = tensile strength
Surface appearance of molded articles: surface appearance immediately after molding
Releasability "Limit cooling time": Releasability evaluation condition 1; Mold temperature = 140° C.

TABLE 3

|  | Comparative Examples | | | | | | |
| --- | --- | --- | --- | --- | --- | --- | --- |
|  | 1 | 2 | 3 | 4 | 5 | 6 | 7 |
| (A-1) Polyethylene terephthalate | — | — | — | 100 | 100 | 100 | 100 |
| (A-3) Polyethylene terephthalate | 100 | 100 | 100 | — | — | — | — |
| (B-1) PIROCHECK68PB | 20 | 20 | 20 | 20 | 20 | 24 | — |
| (C-1) EPIKOTE828 | 2 | — | 3 | — | 24 | 2 | 3 |
| (C-2) EPIKOTE157S70 | — | 2 | — | — | — | — | — |
| (D-1) Antimony trioxide | 4 | 4 | — | — | 4 | — | — |
| (D-2) Sodium antimonate | — | — | 4 | 4 | — | — | — |
| (E-1) Glass fiber | 52 | 52 | 52 | 52 | 52 | 52 | 52 |
| Thioether-type antioxidant | 0.3 | 0.3 | 0.3 | 0.3 | 0.3 | 0.3 | 0.3 |
| Tensile strength (MPa) | 156 | 155 | 151 | 126 |  | 158 | 166 |
| Wet heat resistance [30 hr, tensileness] (%) | 54 | 56 | 47 | 41 | * | 78 | 75 |
| Flame retardancy (1/16 inch) | V-0 | V-0 | V-0 | V-0 |  | V-2 | NOT-V |
| Surface appearance of molded articles: Immediately after molding | ○ | ○ | ○ | Δ |  | Δ | Δ |

*Not moldable
Wet heat resistance: test hour = 30 hrs, Evaluation = tensile strength
Surface appearance of molded articles: surface appearance immediately after molding

TABLE 4

|  | Comparative Examples | | | | |
| --- | --- | --- | --- | --- | --- |
|  | 8 | 9 | 10 | 11 | 12 |
| (A-1) Polyethylene terephthalate | 100 | 100 | 100 | — | — |
| (A-3) Polyethylene terephthalate | — | — | — | 100 | 100 |
| (B-1) PIROCHECK68PB | 20 | 24 | 20 | 20 | 20 |
| (C-1) EPIKOTE828 | — | 2 | 22 | 2 | 3 |
| (D-1) Antimony trioxide | 4 | — | 4 | 4 | 4 |
| (E-1) Glass fiber | 50 | 50 | 50 | 50 | 50 |
| (F-1) Talc | 6 | 6 | 10 | 6 | — |
| (F-3) Kaolin | — | — | — | — | 10 |
| Thioether-type antioxidant | 0.3 | 0.3 | 0.3 | 0.3 | 0.3 |
| Tensile strength (MPa) | 127 | 155 |  | 152 | 146 |
| Wet heat resistance [30 hr, tensileness] (%) | 40 | 76 | * | 51 | 54 |
| Flame retardancy (1/16 inch) | V-0 | V-2 |  | V-0 | V-0 |
| Surface appearance of molded articles: Immediately after molding | Δ | Δ |  | ○ | ○ |
| Limit cooling time (sec) | 14 | 12 |  | 10 | 10 |

*Not moldable
Wet heat resistance: test hour = 30 hrs, Evaluation = tensile strength
Surface appearance of molded articles: surface appearance immediately after molding
Releasability "Limit cooling time": Releasability evaluation condition 1; Mold temperature = 140° C.

TABLE 5

|  | Examples | | | | | | | |
| --- | --- | --- | --- | --- | --- | --- | --- | --- |
|  | 17 | 18 | 19 | 20 | 21 | 22 | 1 | 8 |
| (A-1) Polyethylene terephthalate | 100 | 100 | 100 | 100 | 100 | 100 | 100 | 100 |
| (B-1) PIROCHECK68PB | 20 | 20 | 20 | 20 | 20 | 30 | 20 | 20 |
| (C-1) EPIKOTE828 | 2 | 2 | — | — | 2 | — | 2 | 2 |
| (C-2) EPIKOTE157S70 | — | — | 2 | 2 | — | 2 | — | — |
| (D-1) Antimony trioxide | 4 | 4 | 4 | 4 | 4 | 4 | 4 | 4 |
| (E-1) Glass fiber | 52 | 50 | 52 | 50 | 50 | 50 | 52 | 50 |
| (F-1) Talc | — | 6 | — | 6 | 10 | — | — | 6 |
| Copolymer (1) | 10 | 10 | 10 | 20 | 10 | — | — | — |
| Copolymer (2) | — | — | — | — | — | 10 | — | — |
| Thioether-type antioxidant | 0.3 | 0.3 | 0.3 | 0.3 | 0.3 | 0.3 | 0.3 | 0.3 |
| Surface gloss | Δ | ○ | ○ | ○ | ○ | ○ | x | x |

Examples 23–40 and Comparative Examples 13–25 of the resin composition shown as Embodiment 2 above will be given below.

[EXAMPLE 23]

(A-1) Polyethylene terephthalate (1) 100 parts by weight,
(B-1) Brominated polystyrene 24 parts by weight,
(C-3) Aromatic polycarbodiimide 3 parts by weight,
(D-1) Antimony trioxide 6 parts by weight,,
were admixed and 0.3 parts by weight of a thioether-type antioxidant was further added. Those were stirred in Super mixer and then put into a hopper of a twin-screw extruder TEX44 manufactured by Nippon Seikosho K. K., having a barrel temperature of 260° C. Moreover, through a side feeder of the extruders 52 parts by weight of (E-1) Glass fiber was fed and subjected to melt-extrusion to thus obtain a resin composition. The evaluated results are shown in Table 6.

[EXAMPLES 24–29]

Resin compositions having such compositions as shown in Table 6 were obtained in the same manner as in Example 23. The evaluated results are shown in Table 6.

[EXAMPLE 30]

(A-1) Polyethylene terephthalate (1) 100 parts by weight,
(B-1) Brominated polystyrene 24 parts by weight,
(C-3) Aromatic polycarbodiimide 3 parts by weight,
(D-1) Antimony trioxide 6 parts by weight,
(F-1) Talc 6 parts by weight,
were admixed and 0.3 parts by weight of a thioether-type antioxidant was further added. Those were stirred in Super mixer and then put into a hopper of a twin-screw extruder TEX44 manufactured by Nippon Seikosho K. K., having a barrel temperature of 260° C. Moreover, through a side feeder of the extruder, 50 parts by weight of (E-1) Class fiber was fed and subjected to melt-extrusion to thus obtain a resin composition. The evaluated results are shown in Table 7.

[EXAMPLES 31–35]

Resin compositions having such compositions as shown in Table 7 were obtained in the same manner as in Example 30. The evaluated results are shown in Table 7. For easier comparison, the evaluated results of Example 23 are also shown.

[Comparative Examples 13–25]

Resin compositions were obtained in the same manner as in Examples 23 and 30, except that components were admixed in proportions as shown in Tables 3 and 9. The evaluated results are shown in Tables 8 and 9.

As apparent from the comparison of Table 6 for Examples 23–29 and Table 8 for Comparative Examples 13–19, the resin compositions of the present invention are excellent in every respect of mechanical strength, wet heat resistance, flame retardancy and fluidity, and further good in appearance of molded articles. Moreover, by the conjoint use of specific class of inorganic compound (F), those are excellent in releasability, too.

[EXAMPLE 36]

(A-1) Polyethylene terephthalate (1) 100 parts by weight,
(B-1) Brominated polystyrene 24 parts by weight,
(C-3) Aromatic polycarbodiimide 3 parts by weight,
(D-1) Antimony trioxide 6 parts by weight,
(G) Copolymer (1) 10 parts by weight,
were admixed and 0.3 parts by weight of a thioether-type antioxidant was further added. Those were stirred in Super mixer and then put into a hopper of a twin-screw extruder TEX-44 manufactured by Nippon Seikosho K. K., having a barrel temperature of 260° C. Moreover, through a side feeder of the extruder, 52 parts by weight of (E-1) Glass fiber was fed and subjected to melt-extrusion to thus obtain a resin composition. The evaluated results are shown in Table 10.

[EXAMPLES 37–40]

Resin compositions having such compositions as shown in Table 10 were obtained in the same manner as in Example 36. The evaluated results are shown in Table 10. For easier comparison, the evaluated results of Examples 23 and 30 are also shown.

As apparent from Table 10, by the addition of the copolymer (1) or (2), surface gloss is good even in the case of molding by the use of a low temperature mold.

TABLE 6

| | Examples | | | | | | |
|---|---|---|---|---|---|---|---|
| | 23 | 24 | 25 | 26 | 27 | 28 | 29 |
| (A-1) Polyethylene terephthalate | 100 | 100 | 100 | 100 | 100 | — | — |
| (A-2) Polyethylene terephthalate | — | — | — | — | — | 100 | 100 |
| (B-1) PIRO-CHECK68PB | 24 | 24 | 24 | 36 | 24 | 24 | 24 |
| (C-3) Polycarbodiimide | 3 | 3 | 10 | 5 | 2 | 3 | 3 |
| (D-1) Antimony trioxide | 6 | — | 6 | 6 | 10 | 6 | — |
| (D-2) Sodium antimonate | — | 6 | — | — | — | — | 6 |
| (E-1) Glass fiber | 52 | 52 | 52 | 52 | 52 | 52 | 52 |
| Thioether-type antioxidant | 0.3 | 0.3 | 0.3 | 0.3 | 0.3 | 0.3 | 0.3 |
| Tensile strength (MPa) | 157 | 154 | 147 | 140 | 145 | 146 | 144 |
| Wet heat resistance [30 hr, tensile-ness] (%) | 78 | 75 | 90 | 87 | 74 | 84 | 79 |
| Flame retardancy ($^1$/$_{16}$ inch) | V-0 | V-0 | V-0 | V-0 | V-0 | V-0 | V-0 |
| B-method flow ($10^{-2}$ cc/sec) | 15 | 20 | 31 | 16 | 14 | 12 | 14 |
| Surface appearance of molded articles: Immediately after molding | ◯ | ◯ | ◯ | ◯ | ◯ | ◯ | ◯ |

Wet heat resistance: test hour = 30 hrs, Evaluation = tensile strength
B-method flow; Fluidity evaluation condition 1; Preheating time = 5 min.
Surface appearance of molded articles: surface appearance immediately after molding

TABLE 7

| | Examples | | | | | | |
|---|---|---|---|---|---|---|---|
| | 30 | 31 | 32 | 33 | 34 | 35 | 23 |
| (A-1) Polyethylene terephthalate | 100 | 100 | 100 | — | — | — | 100 |
| (A-1) Polyethylene terephthalate | — | — | — | 100 | 100 | 100 | — |
| (B-1) PIRO-CHECK68PB | 24 | 24 | 24 | 24 | 24 | 24 | 24 |
| (C-3) Polycarbodiimide | 3 | 3 | 6 | 3 | 3 | 3 | 3 |
| (D-1) Antimony trioxide | 6 | — | 6 | 6 | 6 | — | 6 |

TABLE 7-continued

|  | Examples |  |  |  |  |  |  |
|---|---|---|---|---|---|---|---|
|  | 30 | 31 | 32 | 33 | 34 | 35 | 23 |
| (D-2) Sodium antimonate | — | 6 | — | — | — | 6 | — |
| (E-1) Glass fiber | 50 | 50 | 50 | 50 | 50 | 50 | 52 |
| (F-1) Talc | 6 | 8 | 6 | — | — | — | — |
| (F-2) Mica | — | — | — | 10 | — | — | — |
| (F-3) Kaolin | — | — | — | — | 10 | — | — |
| (F-4) Wollastonite | — | — | — | — | — | 10 | — |
| Thioether-type antioxidant | 0.3 | 0.3 | 0.3 | 0.3 | 0.3 | 0.3 | 0.3 |
| Tensile strength (MPa) | 151 | 151 | 144 | 147 | 146 | 145 | 157 |
| Wet heat resistance [30 hr, tensileness] (%) | 74 | 71 | 84 | 80 | 82 | 79 | 78 |
| Flame retardancy (1/16 inch) | V-0 | V-0 | V-0 | V-0 | V-0 | V-0 | V-0 |
| B-method flow ($10^{-2}$ cc/sec) | 15 | 19 | 24 | 12 | 12 | 14 | 15 |
| Limit cooling time (sec) | 10 | 10 | 10 | 14 | 15 | 15 | 22 |
| Surface appearance of molded articles: Immediately after molding | ○ | ○ | ○ | ○ | ○ | ○ | ○ |

Wet heat resistance: test hour = 30 hrs, Evaluation = tensile strength
B-method flow; Fluidity evaluation condition 1; Preheating time = 5 min.
Surface appearance of molded articles: surface after molding
Releasability "Limit cooling time": Releasability evaluation condition 1; Mold temperature = 140° C.

TABLE 8

|  | Comparative Examples |  |  |  |  |  |  |
|---|---|---|---|---|---|---|---|
|  | 13 | 14 | 15 | 16 | 17 | 18 | 19 |
| (A-1) Polyethylene terephthalate | — | — | — | 100 | 100 | 100 | 100 |
| (A-3) Polyethylene terephthalate | 100 | 100 | 100 | — | — | — | — |
| (B-1) PIROCHECK68PB | 24 | 24 | 24 | 24 | 24 | 24 | — |
| (C-3) Polycarbodiimide | 3 | 3 | 3 | — | 23 | 3 | 3 |
| (D-1) Antimony trioxide | 6 | — | — | 6 | 6 | 25 | — |
| (D-2) Sodium antimonate | — | 6 | — | — | — | — | 6 |
| (E-1) Glass fiber | 52 | 52 | 52 | 52 | 52 | 52 | 52 |
| Thioether-type antioxidant | 0.3 | 0.3 | 0.3 | 0.3 | 0.3 | 0.3 | 0.3 |
| Tensile strength (MPa) | 155 | 150 | 158 | 117 | 90 | 87 | 166 |
| Wet heat resistance [30 hr, tensileness] (%) | 52 | 49 | 51 | 42 | 86 | 78 | 74 |
| Flame retardancy (1/16 inch) | V-0 | V-0 | V-2 | V-0 | V-1 | V-0 | NOT-V |
| B-method flow ($10^{-2}$ cc/sec) | 14 | 17 | 18 | 10 | 35 | 9 | 18 |
| Surface appearance of molded articles: Immediately after molding | ○ | ○ | Δ | x | x | x | ○ |

Wet heat resistance: test hour = 30 hrs, Evaluation = tensile strength
B-method flow; Fluidity evaluation condition 1; Preheating time = 5 min.
Surface appearance of molded articles: surface appearance immediately after molding

TABLE 9

|  | Comparative Examples |  |  |  |  |  |
|---|---|---|---|---|---|---|
|  | 20 | 21 | 22 | 23 | 24 | 25 |
| (A-1) Polyethylene terephthalate | 100 | 100 | 100 | — | — | — |
| (A-3) Polyethylene terephthalate | — | — | — | 100 | 100 | 100 |
| (B-1) PIROCHECK68PB | 24 | 24 | 24 | 24 | 24 | 24 |
| (C-3) Polycarbodiimide | — | 23 | 3 | 3 | 3 | 3 |
| (D-1) Antimony trioxide | 6 | 6 | — | — | 6 | — |
| (D-2) Sodium antimonate | — | — | — | 6 | — | 6 |
| (E-1) Glass fiber | 50 | 50 | 50 | 50 | 50 | 50 |
| (F-1) Talc | 6 | 6 | 6 | — | — | — |
| (F-2) Mica | — | — | — | 10 | — | — |
| (F-3) Kaolin | — | — | — | — | 10 | — |
| (F-4) Wollastonite | — | — | — | — | — | 10 |
| Thioether-type antioxidant | 0.3 | 0.3 | 0.3 | 0.3 | 0.3 | 0.3 |
| Tensile strength (MPa) | 124 | 99 | 154 | 144 | 142 | 142 |
| Wet heat resistance [30 hr, tensileness] (%) | 41 | 85 | 70 | 48 | 49 | 46 |
| Flame retardancy (1/16 inch) | V-0 | V-1 | V-2 | V-0 | V-0 | V-0 |
| B-method flow ($10^{-2}$ cc/sec) | 12 | 24 | 19 | 12 | 10 | 12 |
| Limit cooling time (sec) | 16 | 12 | 12 | 12 | 14 | 12 |
| Surface appearance of molded articles: Immediately after molding | Δ | x | Δ | ○ | ○ | ○ |

Wet heat resistance: test hour = 30 hrs, Evaluation = tensile strength
B-method flow; Fluidity evaluation condition 1; Preheating time = 5 min.
Surface appearance of molded articles: surface appearance immediately after molding
Releasability "Limit cooling time": Releasability evaluation condition 1; Mold temperature = 140° C.

TABLE 10

|  | Examples |  |  |  |  |  |  |
|---|---|---|---|---|---|---|---|
|  | 36 | 37 | 38 | 39 | 40 | 23 | 30 |
| (A-1) Polyethylene terephthalate | 100 | 100 | 100 | 100 | 100 | 100 | 100 |
| (B-1) PIRO-CHECK68PB | 24 | 24 | 24 | 24 | 24 | 24 | 24 |
| (C-3) Polycarbodiimide | 3 | 3 | 3 | 3 | 3 | 3 | 3 |

TABLE 10-continued

| | Examples | | | | | | |
|---|---|---|---|---|---|---|---|
| | 36 | 37 | 38 | 39 | 40 | 23 | 30 |
| (D-1) Antimony trioxide | 6 | 6 | 6 | 6 | 6 | 6 | 6 |
| (E-1) Glass fiber | 52 | 50 | 50 | 50 | 50 | 52 | 50 |
| (F-1) Talc | — | 6 | 6 | 6 | — | — | 6 |
| (F-2) Mica | — | — | — | — | 10 | — | — |
| Copolymer (1) | 10 | 10 | 20 | — | — | — | — |
| Copolymer (2) | — | — | — | 10 | 10 | — | — |
| Thioether-type antioxidant | 0.3 | 0.3 | 0.3 | 0.3 | 0.3 | 0.3 | 0.3 |
| Surface gloss | Δ | ◯ | ◯ | ◯ | ◯ | x | x |

Examples 41–60 and Comparative Examples 26–39 of the resin composition shown as Embodiment 3 above will be given below.

[EXAMPLE 41]

(A-1) Polyethylene terephthalate (1) 100 parts by weight,
(B-2) Tetrabromobisphenol A-type epoxy resin (1) 20 parts by weight,
(C-1) Multi-functional epoxy compound (1) 1 part by weight,
(D-2) Sodium antimonate 4 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 52 parts by weight of (E-1) Glass fiber was fed halfway and the those were subjected to melt-extrusion to thus obtain a resin composition. The evaluated results are shown in Table 11.

[EXAMPLES 42–45]

Resin compositions having such compositions as shown in Table 11 were obtained in the same manner as in Example 41. The evaluated results are shown in Table 11.

[EXAMPLE 46]

(A-1) Polyethylene terephthalate (1) 100 parts by weight,
(B-2) Tetrabromobisphenol A-type epoxy resin (1) 20 parts by weight,
(C-1) Multi-functional epoxy compound (1) 1 part by weight,
(D-2) Sodium antimonate 4 parts by weight,
(F-1) Talc 10 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, through a side feeder of the extruder, 50 parts by weight of (E-1) Glass fiber was fed and subjected to melt-extrusion to thus obtain a resin composition. The evaluated results are shown in Table 12.

[EXAMPLES 47–52]

Resin compositions having such compositions as shown in Table 12 were obtained in the same manner as in Example 46. The evaluated results are shown in Table 12.

[Comparative Examples 26–30]

Resin compositions were obtained in the same manner as in Examples 41 and 46, except that components were admixed in proportions as shown in Tables 13 and 14. The evaluated results are shown in Tables 13 and 14.

As apparent from the comparison of Tables 11 and 12 for for Examples and Tables 13 and 14 for Comparative Examples, the resin compositions of the present invention are excellent not only in every respect of flame retardancy, mechanical strength and appearance of molded articles, but in wet heat resistance. Moreover, by the conjoint use of the specific class of inorganic compounds, those are excellent in releasability, too.

[EXAMPLE 53]

(A-1) Polyethylene terephthalate (1) 100 parts by weight,
(B-3) Tetrabromobisphenol A-type epoxy resin (2) 20 parts by weight,
(C-1) Multi-functional epoxy compound (1) 1.5 parts by weight,
(D-1) Antimony trioxide 4 parts by weight,
(G) Copolymer (1) 9 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, through a side feeder of the extruder, 52 parts by weight of (E-1) Glass fiber was fed and subjected to melt-extrusion to thus obtain a resin composition. The evaluated results are shown in Table 15.

[EXAMPLES 54–57]

Resin compositions having such compositions as shown in Table 15 were obtained in the same manner as in Example 53. The evaluated results are shown in Table 15.

By the addition of the copolymer (1) or (2), surface gloss is good even in the case of molding by the use of a low temperature mold.

[EXAMPLES 58–60 AND COMPARATIVE EXAMPLES 37–39]

Discoloration during the molding was evaluated with respect to the resin compositions (Examples 58–60) obtained by Examples 43, 48 and 55, and the resin compositions (Comparative Examples 37–39) obtained by removing the antimony compound and the multi-functional epoxy compound (A) from the resin compositions (Examples 58–60).

As a result, with the resin compositions of Examples, discoloration was rarely observed up to 80% of injection speed and at 80%, discoloration (yellowish change) was slightly observed at the neighborhood of a gate, while with the resin compositions of Comparative Examples, discoloration was already observed at 40%, and at more than 60%, discloration was observed in entire surfaces centered on the neighborhood of a gate.

TABLE 11

| | Examples | | | | |
|---|---|---|---|---|---|
| Resin compositions | 41 | 42 | 43 | 44 | 45 |
| (A-1) Polyethylene terephthalate | 100 | 100 | 100 | 100 | |
| (A-1) Polyethylene terephthalate | | | | | 100 |
| (B-2) Tetrabromobisphenol A epoxy (1) | 20 | | | | |
| (B-3) Tetrabromobisphenol A epoxy (2) | | 28 | 20 | 15 | 20 |

TABLE 11-continued

|  | Examples | | | | |
| --- | --- | --- | --- | --- | --- |
| Resin compositions | 41 | 42 | 43 | 44 | 45 |
| (C-1) Multi-functional epoxy compound (1) | 1.00 |  | 1.50 | 4.50 | 2.00 |
| (C-2) Multi-functional epoxy compound (2) |  | 0.75 |  |  |  |
| (D-1) Antimony trioxide |  | 3 | 4 | 8 | 4 |
| (D-2) Sodium antimonate | 4 |  |  |  |  |
| (E-1) Glass fiber | 52 | 52 | 52 | 52 | 52 |
| Phenol-type antioxidant | 0.35 | 0.35 | 0.35 | 0.35 | 0.35 |
| Thioether-type antioxidant |  | 0.15 |  | 0.15 |  |
| PTFE |  |  |  | 0.15 |  |
| Flame retardancy (UL-94) (1/16 inch) | V-0 | V-0 | V-0 | V-0 | V-0 |
| Tensile strength (MPa) | 152 | 149 | 159 | 152 | 158 |
| Wet heat resistance [40 hr, tensileness] (%) | 78 | 76 | 73 | 77 | 80 |
| Surface appearance of molded articles: Immediately after molding | ○ | ○ | ○ | ○ | ○ |

Wet heat resistance: test hour = 40 hrs, Evaluation = tensile strength
Surface appearance of molded articles: surface appearance immediately after molding

TABLE 12

|  | Examples | | | | | | | |
| --- | --- | --- | --- | --- | --- | --- | --- | --- |
| Resin compositions | 46 | 47 | 48 | 49 | 50 | 51 | 52 | 43 |
| (A-2) Polyethylene terephthalate | 100 | 100 | 100 | 100 | 100 | 100 |  | 100 |
| (A-2) Polyethylene terephthalate |  |  |  |  |  |  | 100 |  |
| (B-1) Tetrabromobisphenol A epoxy (1) | 20 |  |  |  |  | 28 |  |  |
| (B-1) Tetrabromobisphenol A epoxy (2) |  | 28 | 20 | 15 | 20 |  | 20 | 20 |
| (C-1) Multi-functional epoxy compound (1) | 1.00 |  | 1.50 | 4.50 | 1.50 | 1.00 | 1.00 | 1.50 |
| (C-2) Multi-functional epoxy compound(2) |  | 0.75 |  |  |  |  |  |  |
| (D-1) Antimony trioxide |  | 3 | 4 | 8 | 4 | 4 | 4 | 4 |
| (D-2) Sodium antimonate | 4 |  |  |  |  |  |  |  |
| (E-1) Glass fiber | 50 | 50 | 50 | 50 | 50 | 40 | 50 | 52 |
| (F-1) Talc | 10 |  | 10 |  |  | 10 | 10 |  |
| (F-2) Mica |  | 10 |  |  |  | 10 |  |  |
| (F-3) Kaolin |  |  |  | 7 |  |  |  |  |
| (F-4) Calcium silicate |  |  |  |  | 10 |  |  |  |
| Phenol-type antioxidant | 0.35 | 0.35 | 0.35 | 0.35 | 0.35 | 0.35 | 0.35 | 0.35 |
| Thioether-type antioxidant |  | 0.15 |  | 0.15 |  |  | 0.15 |  |
| PTFE |  |  |  | 0.15 |  | 0.15 |  |  |
| Flame retardancy (UL-94) (1/16 inch) | V-0 | V-0 | V-0 | V-0 | V-0 | V-0 | V-0 | V-0 |
| Tensile strength (MPa) | 156 | 158 | 164 | 162 | 157 | 149 | 172 | 156 |
| Wet heat resistance [40 hr, tensileness] (%) | 77 | 77 | 72 | 78 | 71 | 70 | 81 | 73 |
| Limit cooling time (sec) | 19 | 20 | 16 | 22 | 21 | 15 | 25 | 42 |
| Surface appearance of molded articles: Immediately after molding | ○ | ○ | ○ | ○ | ○ | ○ | ○ | ○ |

Wet heat resistance: test hour = 40 hrs, Evaluation = tensile strength
Surface appearance of molded articles: surface appearance immediately after molding
Releasability "Limit cooling time": Releasability evaluation condition 1; Mold temperature = 140° C.

TABLE 13

|  | Comparative Examples | | | | |
| --- | --- | --- | --- | --- | --- |
| Comparative resin compositions | 26 | 27 | 28 | 29 | 30 |
| (A-1) Polyethylene terephthalate |  |  | 100 | 100 | 100 |
| (A-3) Polyethylene terephthalate | 100 |  |  |  |  |
| (A-4) Polyethylene terephthalate |  | 100 |  |  |  |
| (B-2) Tetrabromobisphenol A epoxy (1) |  |  | 65 |  |  |

TABLE 13-continued

|  | Comparative Examples | | | | |
| --- | --- | --- | --- | --- | --- |
| Comparative resin compositions | 26 | 27 | 28 | 29 | 30 |
| (B-3) Tetrabromobisphenol A epoxy (2) | 20 | 20 |  | 20 | 20 |
| (C-1) Multi-functional epoxy compound (1) | 1.50 | 1.50 | 1.00 | 1.50 | 23 |
| (D-1) Antimony trioxide | 4 | 4 |  |  | 4 |
| (D-2) Antimony antimonate |  |  |  | 4 |  |
| (E-1) Glass fiber | 52 | 52 | 52 | 52 | 52 |
| Phenol-type antioxidant | 0.35 | 0.35 | 0.35 | 0.35 | 0.35 |
| Flame retardancy (UL-94) (1/16 inch) | V-0 | V-0 |  | V-2 |  |
| Tensile strength (MPa) | 155 | 156 |  | 152 |  |
| Wet heat resistance [40 hr, tensileness] (%) | 45 | 40 |  | 74 |  |
| Surface appearance of molded articles: Immediately after molding | ○ | ○ | * | Δ | * |

Wet heat resistance: test hour = 40 hrs, Evaluation = tensile strength
Surface appearance of molded articles: surface appearance immediately after molding
*: Molded articles were not obtained.

TABLE 14

| Comparative resin | Comparative Examples | | | | | |
| --- | --- | --- | --- | --- | --- | --- |
| compositions | 31 | 32 | 33 | 34 | 35 | 36 |
| Composition (Parts) |  |  |  |  |  |  |
| (A-1) Polyethylene terephthalate |  | 100 | 100 | 100 | 100 | 100 |
| (A-3) Polyethylene terephthalate | 100 |  |  |  |  |  |

TABLE 14-continued

| Comparative resin compositions | Comparative Examples | | | | | |
|---|---|---|---|---|---|---|
| | 31 | 32 | 33 | 34 | 35 | 36 |
| (B-2) Tetrabromobisphenol A epoxy (1) | | 65 | | | | |
| (B-3) Tetrabromobisphenol A epoxy (2) | 20 | | 20 | 20 | 20 | 20 |
| (C-1) Multi-functional epoxy compound (1) | 1.50 | 1.00 | 1.50 | 23 | 1.50 | 1.50 |
| (D-1) Antimony trioxide | 4 | | | 4 | 4 | 4 |
| (D-2) Sodium antimonate | | 4 | | | | |
| (E-1) Glass fiber | 50 | 50 | 50 | 50 | 50 | 50 |
| (F-1) Talc | 10 | 10 | 10 | 10 | | |
| (F-2) Mica | | | | | 70 | |
| (F-6) Calcium carbonate | | | | | | 10 |
| Phenol-type antioxidant | 0.35 | 0.35 | 0.35 | 0.35 | 0.35 | 0.35 |
| Flame retardancy (UL-94) (1/16 inch) | V-0 | | V-2 | | V-0 | V-0 |
| Tensile strength (MPa) | 159 | | 158 | | 81 | 160 |
| Wet heat resistance [40 hr, tensileness] (%) | 46 | | 73 | | 55 | 74 |
| Limit cooling time (sec) | 18 | | 23 | | 14 | 46 |
| Surface appearance of molded articles: Immediately after molding | ◯ | * | ◯ | * | x | ◯ |

Wet heat resistance: test hour = 40 hrs, Evaluation = tensile strength
Surface appearance of molded articles: surface appearance immediately after molding
Releasability "Limit cooling time": Releasability evaluation condition 1; Mold temperature = 140° C.
*: Molded articles were not obtained.

TABLE 15

| Resin compositions | Examples | | | | | | |
|---|---|---|---|---|---|---|---|
| | 53 | 54 | 55 | 56 | 57 | 43 | 48 |
| Composition (Parts) | | | | | | | |
| (A-1) Polyethylene terephthalate | 100 | 100 | 100 | 100 | 100 | 100 | 100 |
| (B-3) Tetrabromobisphenol A epoxy (2) | 20 | 20 | 20 | 20 | 20 | 20 | 20 |
| (D-1) Antimony trioxide | 4 | 4 | 4 | 4 | 4 | 4 | 4 |
| (C-1) Multi-functional epoxy compound (1) | 1.50 | 1.50 | 1.50 | 1.50 | 1.50 | 1.50 | 1.50 |
| (E-1) Glass fiber | 52 | 52 | 50 | 50 | 50 | 52 | 50 |
| (F-1) Talc | | | 10 | 6 | 10 | | 10 |
| (G) Copolymer (1) | 9 | 18 | 9 | 12 | | | |
| (G) Copolymer (2) | | | | | 9 | | |
| Phenol-type antioxidant | 0.35 | 0.35 | 0.25 | 0.35 | 0.35 | 0.35 | 0.35 |
| Surface gloss | Δ | ◯ | ◯ | ◯ | ◯ | x | x |

Examples 61–77 and Comparative Examples 40–50 of the resin composition shown as Embodiment 4 above will be given below.

[EXAMPLE 61]

(A-1) Polyethylene terephthalate (1) 100 parts by weight,
(B-2) Tetrabromobisphenol A-type epoxy resin (1) 20 parts by weight,
(C-3) Aromatic polycarbodiimide 2 parts by weight,
(D-2) Sodium antimonate 6 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 52 parts by weight of (E-1) Glass fiber was fed halfway and those were subjected to melt-extrusion to thus obtain a resin composition. The evaluated results are shown in Table 16.

[EXAMPLES 62–65]

Resin compositions having such compositions as shown in Table 16 were obtained in the same manner as in Example 61. The evaluated results are shown in Table 16.

[EXAMPLE 66]

(A-1) Polyethylene terephthalate (1) 100 parts by weight,
(B-2) Tetrabromobisphenol A-type epoxy resin (1) 20 parts by weight,
(C-3) Aromatic polycarbodiimide 1 part by weight,
(D-2) Sodium antimonate 4 parts by weight,
(F-1) Talc 10 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 50 parts by weight of (E-1) Glass fiber was fed halfway and those were subjected to melt-extrusion to thus obtain a resin composition. The evaluated results are shown in Table 16.

[EXAMPLES 67–72]

Resin compositions having such compositions as shown in Table 17 were obtained in the same manner as in Example 66. The evaluated results are shown in Table 17. For easier comparison, the evaluated results of Example 63 are also shown.

[Comparative Examples 40–50]

Resin compositions were obtained in the same manner as in Examples 61 and 66, except that components were admixed in proportions as shown in Tables 18 and 19. The evaluated results are shown in Tables 18 and 19.

As apparent from the comparison of Tables 16 and 17 for Examples and Tables 18 and 19 for Comparative Examples, the resin compositions of the present invention are excellent not only in every respect of flame retardancy, mechanical strength and appearance of molded articles due to bleeding of the flame retardant being prevented, but in wet heat resistance. Moreover, by the conjoint use of the specific class of inorganic compound, those are excellent in releasability, too.

[EXAMPLE 73]

(A-1) Polyethylene terephthalate (1) 100 parts by weight
(B-3) Tetrabromobisphenol A-type epoxy resin (2) 20 parts by weight,
(C-3) Aromatic polycarbodiimide 1.50 parts by weight,
(D-1) Antimony trioxide 4 parts by weight,
(G) Copolymer (1) 9 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 52 parts by weight of (E-1) Glass fiber was fed halfway and those were subjected to melt-extrusion to thus obtain a resin composition. The evaluated results are shown in Table 20.

[EXAMPLES 74–77]

Resin compositions having such compositions as shown in Table 20 were obtained in the same manner as in Example 73. The evaluated results are shown in Table 20. For easier comparison, the evaluated results of Examples 63 and 68 are also shown.

By the addition of the copolymer (1) or (2), surface gloss is good even in the case of molding by the use of a low temperature mold.

TABLE 16

|  | Examples | | | | |
|---|---|---|---|---|---|
| Resin compositions | 61 | 62 | 63 | 64 | 65 |
| Composition (Parts) | | | | | |
| (A-1) Polyethylene terephthalate (1) | 100 | 100 | 100 | 100 | |
| (A-2) Polyethylene terephthalate (2) | | | | | 100 |
| (B-2) Tetrabromobisphenol A epoxy (1) | 20 | | | | |
| (B-3) Tetrabromobisphenol A epoxy (2) | | 28 | 20 | 15 | 20 |
| (C-3) Aromatic polycarbodiimide | 2.00 | 5.00 | 1.50 | 1.00 | 1.50 |
| (D-1) Antimony trioxide | | 4 | 4 | 8 | 4 |
| (D-2) Sodium antimonate | 6 | | | | |
| (E-1) Glass fiber | 52 | 52 | 52 | 52 | 52 |
| Phenol-type antioxidant | 0.35 | 0.35 | 0.35 | 0.35 | 035 |

TABLE 16-continued

|  | Examples | | | | |
|---|---|---|---|---|---|
| Resin compositions | 61 | 62 | 63 | 64 | 65 |
| Thioether-type antioxidant | | 0.15 | | 0.15 | |
| PTFE | | | | 0.15 | |
| 3-method flow ($10^{-2}$ cc/sec) | 20 | 18 | 20 | 22 | 17 |
| Flame retardancy (UL-94) (1/16 inch) | V-0 | V-0 | V-0 | V-0 | V-0 |
| Tensile strength (MPa) | 158 | 162 | 163 | 165 | 167 |
| Wet heat resistance [40 hr, tensileness] (%) | 80 | 77 | 75 | 78 | 82 |
| Surface appearance of molded articles Before heating | ○ | ○ | ○ | ○ | ○ |
| Surface appearance of molded articles After heating (2 hr) | ○ | ○ | ○ | ○ | ○ |

B-method flow; Fluidity evaluation condition 1; Preheating time = 5 min.
Wet heat resistance: test hour = 40 hrs, Evaluation = tensile strength
Surface appearance of molded articles: Post-heating appearance evaluation condition 1; Heating for 2 hours

TABLE 17

|  | Examples | | | | | | | |
|---|---|---|---|---|---|---|---|---|
| Resin compositions | 66 | 67 | 68 | 69 | 70 | 71 | 72 | 63 |
| Composition (Parts) | | | | | | | | |
| (A-1) Polyethylene terephalate (1) | 100 | 100 | 100 | 100 | 100 | 100 | | 100 |
| (A-1) Polyethylene terephalate (2) | | | | | | | 100 | |
| (B-2) Tetrabromobisphenol A epoxy (1) | 20 | | | | 28 | | | |
| (B-3) Tetrabromobisphenol A epoxy (2) | | 28 | 20 | 15 | | 20 | 20 | 20 |
| (C-3) Aromatic polycarbodiimide | 1.00 | 5.00 | 1.50 | 1.00 | 2.00 | 1.00 | 1.50 | 1.50 |
| (D-1) Antimony trioxide | | 4 | 4 | 8 | 4 | 4 | 4 | 4 |
| (D-2) Sodium antimonate | 4 | | | | | | | |
| (E-1) Glass fiber | 50 | 50 | 50 | 50 | 50 | 40 | 50 | 52 |
| (F-1) Talc | 10 | | 10 | | | 10 | 10 | |
| (F-2) Mica | | 10 | | | | 10 | | |
| (F-3) Kaolin | | | | 7 | | | | |
| (F-5) Calcium silicate | | | | | 10 | | | |
| Phenol-type antioxidant | 0.35 | 0.35 | 0.35 | 0.35 | 0.35 | 0.35 | 0.35 | 0.35 |
| Thioether-type antioxidant | | 0.15 | | 0.15 | | | 0.15 | |
| PTFE | | | | 0.15 | | 0.15 | | |
| B-method flow ($10^{-2}$ cc/sec) | 22 | 22 | 21 | 23 | 20 | 25 | 18 | 20 |
| Flame retardancy (UL-94) (1/16 inch) | V-0 | V-0 | V-0 | V-0 | V-0 | V-0 | V-0 | V-0 |
| Tensile strength (MPa) | 157 | 157 | 167 | 168 | 162 | 156 | 176 | 163 |
| Wet heat resistance [40 hr, tensileness] (%) | 78 | 79 | 75 | 80 | 76 | 73 | 82 | 75 |
| Limit cooling time (sec) | 18 | 19 | 17 | 20 | 22 | 15 | 24 | 40 |
| Surface appearance of molded articles Before heating | ○ | ○ | ○ | ○ | ○ | ○ | ○ | ○ |
| Surface appearance of molded articles After heating (2 hr) | ○ | ○ | ○ | ○ | ○ | Δ | ○ | ○ |

B-method flow: Fluidity evaluation condition 1; Preheating time = 5 min.
Wet heat resistance: test hour = 40 hrs, Evaluation = tensile strength
Surface appearance of molded articles: post-heating appearance evaluation condition 1; Heating for 2 hours
Releasability "Limit cooling time": Releasability evaluation condition 1; Mold temperature = 140° C.

TABLE 18

| | Comparative Examples | | | | |
|---|---|---|---|---|---|
| Comparative resin compositions | 40 | 41 | 42 | 43 | 44 |
| Composition (Parts) | | | | | |
| (A-1) Polyethylene terephthalate (1) | | | 100 | 100 | 100 |
| (A-3) Polyethylene terephthalate (3) | 100 | | | | |
| (A-4) Polyethylene terephthalate (4) | | 100 | | | |
| (B-2) Tetrabromobisphenol A epoxy (1) | | | 65 | | |
| (B-3) Tetrabromobisphenol A epoxy (2) | 20 | 20 | | 20 | 20 |
| (C-3) Aromatic polycarbodiimide | 1.50 | 1.50 | 1.00 | 1.50 | 30 |
| (D-1) Antimony trioxide | 4 | 4 | | | 4 |
| (D-2) Sodium antimonate | | | 4 | | |
| (E-1) Glass fiber | 52 | 52 | 52 | 52 | 52 |
| Phenol-type antioxidant | 0.35 | 0.35 | 0.35 | 0.35 | 0.35 |
| B-method flow ($10^{-2}$ cc/sec) | 19 | 19 | | 8 | 40 |
| Flame retardancy (UL-94) ($1/16$ inch) | V-0 | V-0 | | V-2 | V-1 |
| Tensile strength (MPa) | 156 | 157 | | 157 | 76 |
| Wet heat resistance [40 hr, tensileness] (%) | 49 | 45 | | 72 | 86 |
| Surface appearance of molded articles Before heating | ○ | ○ | | Δ | x |
| Surface appearance of molded articles After heating (2 hr) | ○ | ○ | * | x | x |

B-method flow; Fluidity evaluation condition 1; Preheating time = 5 min.
Wet heat resistance: test hour = 40 hrs, Evaluation = tensile strength
Surface appearance of molded articles: Post-heating appearance evaluation condition 1; Heating for 2 hours
*: Molded articles were not obtained.

TABLE 19

| | Comparative Examples | | | | | |
|---|---|---|---|---|---|---|
| Comparative resin compositions | 45 | 46 | 47 | 45 | 49 | 50 |
| Composition (Parts) | | | | | | |
| (A-1) Polyethylene terephthalate (1) | | 100 | 100 | 100 | 100 | 100 |
| (A-3) Polyethylene terephthalate (3) | 100 | | | | | |
| (B-2) Tetrabromobisphenol A epoxy (1) | | 65 | | | | |
| (B-3) Tetrabromobisphenol A epoxy (2) | 20 | | 20 | 20 | 20 | 20 |
| (C-3) Aromatic polycarbodiimide | 1.50 | 1.00 | 1.50 | 30 | 1.30 | 1.50 |
| (D-1) Antimony trioxide | 4 | | | 4 | 4 | 4 |
| (D-2) Sodium antimonate | | 4 | | | | |
| (E-1) Glass fiber | 50 | 50 | 50 | 50 | 50 | 50 |
| (F-1) Talc | 10 | 10 | 10 | 10 | | |
| (F-2) Mica | | | | | 70 | |
| (F-6) Calcium carbonate | | | | | | 10 |
| Phenol-type antioxidant | 0.35 | 0.35 | 0.35 | 0.35 | 0.35 | 0.35 |
| B-method flow ($10^{-2}$ cc/sec) | 19 | | 10 | 50 | 47 | 20 |
| Flame retardancy (UL-94) ($1/16$ inch) | V-0 | | V-2 | V-1 | V-0 | V-0 |
| Tensile strength (MPa) | 164 | | 168 | 68 | 74 | 163 |
| Wet heat resistance [40 hr, tensileness] (%) | 50 | | 75 | 86 | 53 | 75 |
| Limit cooling time (sec) | 17 | | 22 | 16 | 14 | 44 |
| Surface appearance of molded articles Before heating | ○ | ○ | | x | x | ○ |
| Surface appearance of molded articles After heating (2 hr) | ○ | * | Δ | x | x | ○ |

B-method flow; Fluidity evaluation condition 1; Preheating – time = 5 min.
Wet heat resistance: test hour = 40 hrs, Evaluation = tensile strength
Surface appearance of molded articles: Post-heating appearance evaluation condition 1; Heating for 2 hours
Releasability "Limit cooling time"; Releasability evaluation condition 1; Mold temperature = 140° C.
*: Molded articles were not obtained.

TABLE 20

| Resin compositions | Examples | | | | | | |
|---|---|---|---|---|---|---|---|
| | 73 | 74 | 75 | 76 | 77 | 63 | 68 |
| Composition (Parts) | | | | | | | |
| (A-1) Polyethylene terephthalate | 100 | 100 | 100 | 100 | 100 | 100 | 100 |
| (B-3) Tetrabromobisphenol A epoxy (2) | 20 | 20 | 20 | 20 | 20 | 20 | 20 |
| (C-3) Aromatic polycarbodiimide | 1.50 | 1.50 | 1.50 | 1.50 | 1.50 | 1.50 | 1.50 |
| (D-1) Antimony trioxide | 4 | 4 | 4 | 4 | 4 | 4 | 4 |
| (E-1) Glass fiber | 52 | 52 | 50 | 50 | 50 | 52 | 50 |
| (F-1) Talc | | | 10 | 6 | 10 | | 10 |
| (G) Copolymer (1) | 9 | 18 | 9 | 12 | | | |
| (G) copolymer (2) | | | | | 9 | | |
| Phenol-type antioxidant | 0.35 | 0.35 | 0.35 | 0.35 | 0.35 | 0.35 | 0.35 |
| Surface gloss | Δ | ○ | ○ | ○ | ○ | x | x |

Examples 78–97 and Comparative Examples 50–64 of the resin composition shown as Embodiment 5 above will be given below.

[EXAMPLE 78]

(A-1) Polyethylene terephthalate (1) 100 parts by weight,
(B-6) Tetrabromobisphenol A-type phenoxy resin (2) 20 parts by weight,
(C-1) Multi-functional epoxy compound (1) 3 parts by weight,
(D-1) Antimony trioxide 5 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 53 parts by weight of (E-1) Glass fiber was fed halfway and those were subjected to melt-extrusion to thus obtain a resin composition. The evaluated results are shown in Table 21.

[EXAMPLES 79–82]

Resin compositions having such compositions as shown in Table 21 were obtained in the same manner as in Example 78. The evaluated results are shown in Table 21.

[EXAMPLE 83]

(A-1) Polyethylene terephthalate (1) 100 parts by weight,
(B-7) Tetrabromobisphenol A-type phenoxy resin (3) 20 parts by weight,
(C-1) Multi-functional epoxy compound (1) 3 parts by weight,
(D-1) Antimony trioxide 4 parts by weight,
(F-1) Talc 8 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 50 parts by weight of (E-1) Glass fiber was fed halfway and those were subjected to melt-extrusion to thus obtain a resin composition. The evaluated results are shown in Table 22.

[EXAMPLES 84–89]

Resin compositions having such compositions as shown in Table 22 were obtained in the same manner as in Example 83. The evaluated results are shown in Table 22.

[Comparative Examples 51–61]

Resin compositions were obtained in the same manner as in Examples 78 and 83, except that components were admixed in proportions as shown in Tables 23 and 24. The evaluated results are shown in Tables 23 and 24.

As apparent from the comparison of Tables 21 and 22 for Examples and Tables 23 and 24 for Comparative Examples, the resin compositions of the present invention are excellent not only in flame retardancy, mechanical strength, but in wet heat resistance even in thin-wall molded articles. Moreover, by the conjoint use of the specific class of inorganic compounds, those are excellent in releasability, too.

[EXAMPLE 90]

(A-1) Polyethylene terephthalate (1) 100 parts by weight,
(B-6) Tetrabromobisphenol A-type phenoxy resin (2) 20 parts by weight,
(C-1) Multi-functional epoxy compound (1) 3 parts by weight,
(D-1) Antimony trioxide 5 parts by weight,
(G) Copolymer (1) 9 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 53 parts by weight of (E-1) Glass fiber was fed halfway and those were subjected to melt-extrusion to thus obtain a resin composition. The evaluated results are shown in Table 25.

[EXAMPLES 91–94]

Resin compositions having such compositions as shown in Table 25 were obtained in the same manner as in Example 90. The evaluated results are shown in Table 25.

By the addition of the copolymer (1) or (2), surface gloss is good even in the case of molding by the use of a low temperature mold.

[EXAMPLES 95–97 AND COMPARATIVE EXAMPLES 62–64]

Discoloration during the molding was evaluated with respect to the resin compositions (Examples 95–97) obtained by Examples 78, 85 and 92, and the resin compositions (Comparative Examples 62–64) obtained by removing the antimony compound and the multi-functional epoxy compound (1) from the resin compositions (Examples 95–97).

As a result, with the resin compositions of Examples, discoloration was rarely observed up to 80% of injection speed and at 80%, discoloration (yellowish change) was slightly observed at the neighborhood of a gate, while with the resin compositions of Comparative Examples, discoloration was already observed at 40%, and at more than 60%, discloration was observed in entire surfaces centered on the the neighborhood of a gate.

TABLE 21

| | Examples | | | | |
|---|---|---|---|---|---|
| Resin compositions | 78 | 79 | 80 | 81 | 82 |
| Composition (Parts) | | | | | |
| (A-2) Polyethylene terephthalate (1) | 100 | 100 | 100 | 100 | |
| (A-2) Polyethylene terephthalate (2) | | | | | 100 |
| (B-6) Tetrabromobisphenol A phenoxy (2) | 20 | 30 | 15 | | 2 |
| (B-7) Tetrabromobisphenol A phenoxy (3) | | | | 20 | |
| (C-1) Multi-functional epoxy compound (1) | 3 | | 5 | 2 | 3 |
| (C-2) Multi-functional epoxy compound (2) | | 1 | | | |
| (D-1) Antimony trioxide | 5 | 5 | | 5 | 5 |
| (D-2) Sodium antimonate | | | 10 | | |
| (E-1) Glass fiber | 53 | 53 | 53 | 53 | 53 |
| Phenol-type antioxidant | 0.35 | 0.35 | 0.35 | 0.35 | 0.35 |
| Thioether-type antioxidant | | 0.15 | 0.15 | | |
| PTFE | | | 0.20 | 0.20 | |
| Flame retardancy (UL-94) (1/16 inch) | V-0 | V-0 | V-0 | V-0 | V-0 |
| Flame retardancy (UL-94) (1/32 inch) | V-0 | V-0 | V-0 | V-0 | V-0 |
| Bending strength (MPa) | 209 | 208 | 213 | 206 | 226 |
| Wet heat resistance [40 hr, tensileness] (%) | 72 | 70 | 74 | 75 | 78 |

Wet heat resistance : test hour = 40 hrs, Evaluation = Bending strength

TABLE 23

| | Comparative Examples | | | | |
|---|---|---|---|---|---|
| Comparative resin compositions | 51 | 52 | 53 | 54 | 55 |
| Composition (Parts) | | | | | |
| (A-1) Polyethylene terephthalate (1) | | | 100 | 100 | 100 |
| (A-3) Polyethylene terephthalate (3) | 100 | | | | |
| (A-4) Polyethylene terephthalate (4) | | 100 | | | |
| (B-6) Tetrabromobisphenol A phenoxy (2) | 20 | 20 | 65 | 20 | 20 |
| (C-1) Multi-functional epoxy compound (1) | 3 | 3 | 3 | 3 | 25 |
| (D-1) Antimony trioxide | 5 | 5 | 5 | | 5 |
| (E-1) Glass fiber | 53 | 53 | 53 | 53 | 53 |
| Phenol-type antioxidant | 0.35 | 0.35 | 0.35 | 0.35 | 0.35 |
| Flame retardancy (UL-94) (1/16 inch) | V-0 | V-0 | V-0 | V-2 | |
| Flame retardancy (UL-94) (1/32 inch) | V-0 | V-0 | V-0 | notV | |
| Bending strength (MPa) | 210 | 209 | 119 | 206 | |
| Wet heat resistance [40 hr, tensileness] (%) | 44 | 43 | 70 | 72 | * |

Wet heat resistance: test hour = 40 hrs, Evaluation = Bending strength
*: Molded articles were not obtained.

TABLE 22

| | Examples | | | | | | | |
|---|---|---|---|---|---|---|---|---|
| Resin compositions | 83 | 84 | 85 | 86 | 87 | 88 | 89 | 78 |
| Composition (Parts) | | | | | | | | |
| (A-1) Polyethylene terephthalate (1) | 100 | 100 | 100 | 100 | 100 | 100 | | 100 |
| (A-2) Polyethylene terephthalate (2) | | | | | | | 100 | |
| (B-6) Tetrabromobisphenol A phenoxy (2) | | 30 | 20 | 15 | 20 | | 20 | 20 |
| (B-7) Tetrabromobisphenol A phenoxy (3) | 20 | | | | | 30 | | |
| (C-1) Multi-functional epoxy compound (1) | 3 | | 3 | 5 | | 1 | 2 | 3 |
| (C-2) Multi-functional epoxy compound (2) | | 2 | | | 2 | 1 | | |
| (D-1) Antimony trioxide | 4 | 4 | 4 | | 4 | 4 | 4 | 5 |
| (D-2) Sodium antimonate | | | | 10 | | | | |
| (E-1) Glass fiber | 50 | 50 | 50 | 50 | 50 | 40 | 50 | 53 |
| (F-1) Talc | 8 | | 8 | | | 10 | 10 | |
| (F-2) Mica | | 10 | | | | 10 | | |
| (F-3) Kaolin | | | | 5 | | | | |
| (F-5) Calcium silicate | | | | | 12 | | | |
| Phenol-type antioxidant | 0.35 | 0.35 | 0.35 | 0.35 | 0.35 | 0.35 | 0.35 | 0.35 |
| Thioether-type antioxidant | | 0.15 | | | | | 0.15 | |
| PTFE | | | | 0.20 | | | | |
| Flame retardancy (UL-94) (1/16 inch) | V-0 | V-0 | V-0 | V-0 | V-0 | V-0 | V-0 | V-0 |
| Flame retardancy (UL-94) (1/32 inch) | V-0 | V-0 | V-0 | V-0 | V-0 | V-0 | V-0 | V-0 |
| Bending strength (MPa) | 217 | 206 | 217 | 216 | 210 | 206 | 229 | 209 |
| Wet heat resistance [40 hr, tensileness] %) | 74 | 70 | 72 | 76 | 70 | 70 | 79 | 72 |
| Limit cooling time (sec) | 19 | 20 | 18 | 16 | 22 | 16 | 24 | 42 |

Wet heat resistance: test hour = 40 hrs, Evaluation = Bending strength
Releasability "Limit cooling time": Releasability evaluation condition 1; Mold temperature = 140° C.

TABLE 24

| Comparative resin compositions | Comparative Examples ||||||
|---|---|---|---|---|---|---|
| | 56 | 57 | 58 | 59 | 60 | 61 |
| Composition (Parts) | | | | | | |
| (A-3) Polyethylene terephthalate (1) | | 100 | 100 | 100 | 100 | 100 |
| (A-3) Polyethylene terephthalate (3) | 100 | | | | | |
| (B-6) Tetrabromobisphenol A phenoxy (2) | 20 | 65 | 20 | 20 | 20 | 20 |
| (C-1) Multi-functional epoxy compound (1) | 3 | 3 | 3 | 25 | 3 | 3 |
| (D-1) Antimony trioxide | 4 | 4 | | 4 | 4 | 4 |
| (E-1) Glass fiber | 50 | 50 | 50 | 50 | 50 | 50 |
| (F-1) Talc | 8 | 8 | 8 | 8 | | |
| (F-2) Mica | | | | | 70 | |
| (F-6) Calcium carbonate | | | | | | 8 |
| Phenol-type antioxidant | 0.35 | 0.35 | 0.35 | 0.35 | 0.35 | 0.35 |
| Flame retardancy (UL-94) (1/16 inch) | V-0 | V-0 | V-2 | | V-0 | V-0 |
| Flame retardancy (UL-94) (1/32 inch) | V-0 | V-0 | notV | | V-0 | V-0 |
| Bending strength (MPa) | 218 | 127 | 216 | | 108 | 207 |
| Wet heat resistance [40 hr, tensileness] (%) | 43 | 69 | 67 | | 52 | 70 |
| Limit cooling time (sec) | 17 | 35 | 23 | * | 14 | 45 |

Wet heat resistance: test hour = 40 hrs, Evaluation = Bending strength
Releasability "Limit cooling time": Releasability evaluation condition 1; Mold temperature = 140° C.
*: Molded articles were not obtained.

TABLE 25

| | Examples |||||||
|---|---|---|---|---|---|---|---|
| Resin compositions | 90 | 91 | 92 | 93 | 94 | 78 | 85 |
| Composition (Parts) | | | | | | | |
| (A-1) Polyethylene terephthalate (1) | 100 | 100 | 100 | 100 | 100 | 100 | 100 |
| (B-6) Tetrabromobisphenol A phenoxy (2) | 20 | 20 | 20 | 20 | 20 | 20 | 20 |
| (C-1) Multi-functional A epoxy compound (1) | 3 | 3 | 3 | 3 | 3 | 3 | 3 |
| (D-1) Antimony trioxide | 5 | 5 | 4 | 4 | 4 | 5 | 4 |
| (E-1) Glass fiber | 53 | 53 | 50 | 50 | 50 | 53 | 50 |
| (F-1) Talc | | | 8 | 5 | 8 | | 8 |
| (G) Copolymer (1) | 9 | 18 | 9 | 12 | | | |
| (G) Copolymer (2) | | | | | 9 | | |
| Phenol-type antioxidant | 0.35 | 0.35 | 0.35 | 0.35 | 0.35 | 0.35 | 0.35 |
| Surface gloss | Δ | ○ | ○ | ○ | ○ | x | x |

Examples 98–114 and Comparative Examples 65–75 of the resin composition shown as Embodiment 6 above will be given below.

[EXAMPLE 98]

(A-1) Polyethylene terephthalate (1) 100 parts by weight,
(B-6) Tetrabromobisphenol A-type phenoxy resin (2) 20 parts by weight,
(C-3) Aromatic policarbodiimide 3 parts by weight,
(D-1) Antimony trioxide 5 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 53 parts by weight of (E-1) Glass fiber was fed halfway and those were subjected to melt-extrusion to thus obtain a resin composition. The evaluated results are shown in Table 26.

[EXAMPLES 99–102]

Resin compositions having such compositions as shown in Table 26 were obtained in the same manner as in Example 98. The evaluated results are shown in Table 26.

[EXAMPLE 103]

(A-1) Polyethylene terephthalate (1) 100 parts by weight,
(B-6) Tetrabromobisphenol A-type phenoxy resin (2) 22 parts by weight,
(C-3) Aromatic policarbodiimide 3 parts by weight,
(D-1) Antimony trioxide 4 parts by weight,
(F-1) Talc 8 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 50 parts by weight of (E-1) Glass fiber was fed halfway and those were subjected to melt-extrusion to thus obtain a resin composition. The evaluated results are shown in Table 27.

[EXAMPLES 104–109]

Resin compositions having such compositions as shown in Table 27 were obtained in the same manner as in Example 103. The evaluated results are shown in Table 27. For easier comparison, the evaluated results of Example 98 are also shown.

[Comparative Examples 65–75]

Resin compositions were obtained in the same manner as in Examples 98 and 103, except that components were admixed in proportions as shown in Tables 28 and 29. The evaluated results are shown in Tables 28 and 29.

As apparent from the comparison of Tables 26 and 27 for Examples and Tables 28 and 29 for Comparative Examples, the resin compositions of the present invention are excellent not only in flame retardancy, molding fluidity and mechanical strength even in thin-wall molded articles, but in wet heat resistance. Moreover, by the conjoint use of the specific class of inorganic compounds, those are excellent in releasability, too.

[EXAMPLE 110]

(A-1) Polyethylene terephthalate (1) 100 parts by weight,
(B-6) Tetrabromobisphenol A-type phenoxy resin (2) 22 parts by weight,
(C-3) Aromatic policarbodiimide 3 parts by weight,
(D-1) Antimony trioxide 5 parts by weight, (G) Copolymer (1) 9 parts by weight, and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 53 parts by weight of (E-1) Glass fiber was fed halfway and those were subjected to melt-extrusion to thus obtain a resin composition. The evaluated results are shown in Table 30.

[EXAMPLES 111–114]

Resin compositions having such compositions as shown in Table 30 were obtained in the same manner as in Example 110. The evaluated results are shown in Table 30. For easier comparison, the evaluated results of Examples 98 and 103 are also shown.

By the addition of the copolymer (1) or (2), surface gloss is good even in the case of molding by the use of a low temperature mold.

TABLE 26

| | Examples | | | | |
|---|---|---|---|---|---|
| Resin compositions | 98 | 99 | 100 | 101 | 102 |
| Composition (Parts) | | | | | |
| (A-1) Polyethylene terephthalate (1) | 100 | 100 | 100 | 100 | |
| (A-1) Polyethylene terephthalate (2) | | | | | 100 |

TABLE 26-continued

| | Examples | | | | |
|---|---|---|---|---|---|
| Resin compositions | 98 | 99 | 100 | 101 | 102 |
| (B-6) Tetrabromobisphenol A phenoxy (2) | 22 | 30 | 15 | | 22 |
| (B-7) Tetrabromobisphenol A phenoxy (3) | | | | 22 | |
| (C-3) Aromatic polycarbodiimide | 3 | 6 | 1.5 | 2 | 3 |
| (D-1) Antimony trioxide | 5 | 5 | | 5 | 5 |
| (D-2) Sodium antimonate | | | 10 | | |
| (E-1) Glass fiber | 53 | 53 | 53 | 53 | 53 |
| Phenol type antioxidant | 0.35 | 0.35 | 0.35 | 0.35 | 0.35 |
| Thioether-type antioxidant | | 0.15 | | 0.15 | |
| PTFE | | | 0.15 | | |
| B-method flow ($10^{-2}$ cc/sec) | 21 | 17 | 27 | 24 | 16 |
| Flame retardancy (UL-94) ($\frac{1}{16}$ inch) | V-0 | V-0 | V-0 | V-0 | V-0 |
| Flame retardancy (UL-94) ($\frac{1}{32}$ inch) | V-0 | V-0 | V-0 | V-0 | V-0 |
| Bending strength (MPa) | 207 | 206 | 211 | 202 | 225 |
| Wet heat resistance [40 hr, tensileness] (%) | 75 | 78 | 72 | 74 | 80 |

B-method flow; Fluidity evaluation condition 1; Preheating time = 5 min.
Wet heat resistance: test hour = 40 hrs, Evaluation = Bending strength

TABLE 27

| | Examples | | | | | | | |
|---|---|---|---|---|---|---|---|---|
| Resin compositions | 103 | 104 | 105 | 106 | 107 | 108 | 109 | 98 |
| Composition (Parts) | | | | | | | | |
| (A-1) Polyethylene terephthalate (1) | 100 | 100 | 100 | 100 | 100 | 100 | | 100 |
| (A-1) Polyethylene terephthalate (2) | | | | | | | 100 | |
| (B-6) Tetrabromobisphenol A phenoxy (2) | 22 | 22 | | 30 | 22 | | 22 | 22 |
| (B-7) Tetrabromobisphenol A phenoxy (3) | | | 22 | | | 16 | | |
| (C-3) Aromatic polycarbodiimide | 3 | 3 | 2 | 6 | 3 | 1.5 | 3 | 3 |
| (D-1) Antimony trioxide | 4 | | 4 | 4 | 4 | 8 | 4 | 5 |
| (D-2) Soidum antimonate | | 10 | | | | | | |
| (E-1) Glass fiber | 50 | 50 | 50 | 50 | 50 | 50 | 50 | 53 |
| (F-1) Talc | 8 | | 8 | | | 10 | 10 | |
| (F-2) Mica | | 4 | | | | | 10 | |
| (F-3) Kaolin | | | | | 10 | | | |
| (F-4) Calcium silicate | | | | | | 12 | | |
| Phenol-type antioxidant | 0.35 | 0.35 | 0.35 | 0.35 | 0.35 | 0.35 | 0.35 | 0.35 |
| Thioether-type antioxidant | | | 0.15 | | 0.15 | | | |
| PTFE | | | | | | 0.20 | | |
| B-method flow ($10^{-2}$ cc/sec) | 22 | 22 | 22 | 23 | 20 | 26 | 18 | 20 |
| Flame retardancy (UL-94) ($\frac{1}{16}$ inch) | V-0 | V-0 | V-0 | V-0 | V-0 | V-0 | V-0 | V-0 |
| Flame retardancy (UL-94) ($\frac{1}{32}$ inch) | V-0 | V-0 | V-0 | V-0 | V-0 | V-0 | V-0 | V-0 |
| Bending strength (MPa) | 216 | 221 | 215 | 205 | 216 | 211 | 228 | 207 |
| Wet heat resistance [40 hr, tensileness] (%) | 74 | 70 | 73 | 79 | 74 | 72 | 81 | 75 |
| Limit cooling time (sec) | 18 | 16 | 17 | 20 | 22 | 16 | 24 | 40 |

B-method flow; Fluidity evaluation condition 1; Preheating time = 5 min.
Wet heat resistance: test hour = 40 hrs, Evaluation = Bending strength
Releasability "Limit cooling time": Releasability evaluation condition 1; Mold temperature = 140° C.

TABLE 28

| Comparative resin compositions | Comparative Examples | | | | |
|---|---|---|---|---|---|
| | 65 | 66 | 67 | 68 | 69 |
| Composition (Parts) | | | | | |
| (A-1) Polyethylene terephthalate (1) | | | 100 | 100 | 100 |
| (A-3) Polyethylene terephthalate (3) | 100 | | | | |
| (A-4) Polyethylene terephthalate (4) | | 100 | | | |
| (B-6) Tetrabromobisphenol A phenoxy (2) | 22 | 22 | 65 | 22 | 22 |
| (C-3) Aromatic polycarbodiimide | 3 | 3 | 3 | 3 | 30 |
| (D-1) Antimony trioxide | 5 | 5 | 5 | | 5 |
| (E-1) Glass fiber | 53 | 53 | 53 | 53 | 53 |
| Phenol-type antioxidant | 0.35 | 0.35 | 0.35 | 0.35 | 0.35 |
| B-method flow ($10^{-2}$ cc/sec) | 20 | 20 | 3 | 12 | 34 |
| Flame retardancy (UL-94) (1/16 inch) | V-0 | V-0 | V-0 | V-2 | V-1 |
| Flame retardancy (UL-94) (1/32 inch) | V-0 | V-0 | V-0 | notV | notV |
| Bending strength (MPa) | 206 | 207 | 118 | 206 | 147 |
| Wet heat resistance [40 hr, tensileness] (%) | | 49 | 45 | 75 | 72 | 86 |

B-method flow; Fluidity evaluation condition 1; Preheating time = 5 min.
Wet heat resistance: test hour = 40 hrs, Evaluation = Bending strength

TABLE 29

| Comparative resin compositions | Comparative Examples | | | | | |
|---|---|---|---|---|---|---|
| | 70 | 71 | 72 | 73 | 74 | 75 |
| (A-1) Polyethylene terephthalate (1) | | 100 | 100 | 100 | 100 | 100 |
| (A-3) Polyethylene terephthalate (3) | 100 | | | | | |
| (B-6) Tetrabromobisphenol A phenoxy (2) | 22 | 65 | 22 | 22 | 22 | 22 |
| (C-3) Aromatic polycarbodiimide | 3 | 3 | 3 | 30 | 3 | 3 |
| (D-1) Antimony trioxide | 4 | 4 | | 4 | 4 | 4 |
| (E-1) Glass fiber | 50 | 50 | 50 | 50 | 50 | 50 |
| (F-1) Talc | 8 | 8 | 8 | 8 | | |
| (F-2) Mica | | | | | 70 | |
| (F-6) Calcium carbonate | | | | | | 8 |
| Phenol-type antioxidant | 0.35 | 0.35 | 0.35 | 0.35 | 0.35 | 0.35 |
| B-method flow ($10^{-2}$ cc/sec) | 21 | 5 | 14 | 40 | 50 | 20 |
| Flame retardancy (UL-94) (1/16 inch) | V-0 | V-0 | V-2 | V-1 | V-0 | V-0 |
| Flame retardancy (UL-94) (1/32 inch) | V-0 | V-0 | notV | notV | V-0 | V-0 |
| Bending strength (MPa) | 217 | 127 | 216 | 157 | 118 | 206 |
| Wet heat resistance [40 hr, tensileness] (%) | 47 | 72 | 70 | 85 | 54 | 75 |
| Limit cooling time (sec) | 17 | 35 | 27 | 16 | 14 | 42 |

B-method flow; Fluidity evaluation condition 1; Preheating time = 5 min.
Wet heat resistance: test hour = 40 hrs, Evaluation = Bending strength
Releasability "Limit cooling time": Releasability evaluation condition 1; Mold temperature = 140° C.

TABLE 30

| Resin compositions | Examples | | | | | | |
|---|---|---|---|---|---|---|---|
| | 110 | 111 | 112 | 113 | 114 | 98 | 103 |
| Composition (Parts) | | | | | | | |
| (A-1) Polyethylene terephthalate (1) | 100 | 100 | 100 | 100 | 100 | 100 | 100 |
| (B-6) Tetrabromobisphenol A phenoxy (2) | 22 | 22 | 22 | 22 | 22 | 22 | 22 |
| (C-1) Aromatic polycarbodiimide | 3 | 3 | 3 | 3 | 3 | 3 | 3 |

TABLE 30-continued

| Resin compositions | Examples | | | | | | |
|---|---|---|---|---|---|---|---|
| | 110 | 111 | 112 | 113 | 114 | 98 | 103 |
| (D-1) Antimony trioxide | 5 | 5 | 4 | 4 | 4 | 5 | 4 |
| (E-1) Glass fiber | 53 | 53 | 50 | 50 | 50 | 53 | 50 |
| (F-1) Talc | | | 8 | 5 | 8 | | 8 |
| (G) Copolymer (1) | 9 | 18 | 9 | 12 | | | |
| (G) Copolymer (2) | | | | | 9 | | |
| Phenol-type antioxidant | 0.35 | 0.35 | 0.35 | 0.35 | 0.35 | 0.35 | 0.35 |
| Surface gloss | Δ | ○ | ○ | ○ | ○ | x | x |

Examples 115–129 and Comparative Examples 76–88 of the resin composition shown as Embodiment 7 above will be given below.

[EXAMPLE 115]

(A-1) Polyethylene terephthalate (5) 100 parts by weight,
(B-9) Halogenated polystyrene (2) 8 parts by weight,
(C-4) Tetrabromobisphenol A-type epoxy compound (5) 10 parts by weight,
(D-1) Antimony trioxide 5 parts by weight,
and 0.35 parts by weight of a thioether-type antioxidant were previously dry-blended, and then put into a hopper of a twin-screw extruder TEX-44 manufactured by Nippon Seikosho K. K., having a cylinder temperature of 260 ° C. Moreover, 53 parts by weight of (E-1) Glass fiber was fed halfway and those were subjected to melt-extrusion to thus obtain a resin composition. The evaluated results are shown in Table 31.

[EXAMPLES 116–120]

Resin compositions having such compositions as shown in Table 31 were obtained in the same manner as in Example 115. The evaluated results are shown in Table 31,

[EXAMPLE 121]

(A-1) Polyethylene terephthalate (5) 100 parts by weight,
(B-9) Halogenated polystyrene (2) 8 parts by weight,
(C-4) Tetrabromobisphenol A-type epoxy compound (5) 10 parts by weight,
(D-1) Antimony trioxide 4 parts by weight,
(F-1) Talc 8 parts by weight,
and 0.35 parts by weight of a thioether-type antioxidant were previously dry-blended, and then put into a hopper of a twin-screw extruder TEX44 manufactured by Nippon Seikosho K. K., having a cylinder temperature of 260° C. Moreover, 50 parts by weight of (E-1) Glass fiber was fed halfway and those were subjected to melt-extrusion to thus obtain a resin composition. The evaluated results are shown in Table 32.

[EXAMPLES 122–125]

Resin compositions having such compositions as shown in Table 32 were obtained in the same manner as in Example 115 . The evaluated results are shown in Table 32. For easier composition, the evaluated results of Example 115 are also shown.

[Comparative Examples 76–86]

Resin compositions were obtained in the same manner as in Examples 115 and 121, except that components were admixed 4in proportions as shown in Tables 33 and 34. The evaluated results are shown in Tables 33 and 34.

As apparent from the comparison of Tables 31 and 32 for Examples and Tables 33 and 34 for Comparative Examples, the resin compositions of the present invention are excellent not only in flame retardancy, molding fluidity and tensile strength, but in wet heat resistance. And a molded article of excellent appearance is obtained since bleeding of the flame retardant does not occur even after heating treatment at a high temperature. Moreover, by the conjoint use of the specific class of inorganic compound, those are excellent in releasability, too.

[EXAMPLE 126]

(A-5) Polyethylene terephthalate (5) 100 parts by weight,
(B-9) Halogenated polystyrene (2) 8 parts by weight,
(C-4) Tetrabromobisphenol A-type epoxy compound (5) 10 parts by weight,
(D-1) Antimony trioxide 5 parts by weight,
(G) Copolymer (1) 9 parts by weight,
and 0.35 parts by weight of a thioether-type antioxidant were previously dry-blended, and then put into a hopper of a twin-screw extruder TEX44 manufactured by Nippon Seikosho K. K., having a cylinder temperature of 260° C. Moreover, 53 parts by weight of (E-1) Glass fiber was fed halfway and those were subjected to melt-extrusion to thus obtain a resin composition. The evaluated results are shown in Table 35.

[EXAMPLES 127–129]

Resin compositions having such compositions as shown in Table 35 were obtained in the same manner as in Example 126. The evaluated results are shown in Table 35. For easier comparison, the evaluated results of Examples 115 and 121 are also shown.

Table 35 shows that by the addition of the copolymer (1) or (2), surface gloss is good even in the case of molding by the use of a low temperature mold.

TABLE 31

| | Examples | | | | | |
|---|---|---|---|---|---|---|
| Resin compositions | 115 | 116 | 117 | 118 | 119 | 120 |
| Composition (Parts) | | | | | | |
| (A-5) Polyethylene terephthalate (5) | 100 | 100 | 100 | 100 | 100 | 50 |
| (A-6) Polyethylene terephthalate (6) | | | | | | 50 |
| (B-9) Halogenated polystyrene resin (2) | 8 | | | 17.5 | | 16 |
| (B-10) Halogenated polystyrene resin (3) | | 9 | 3 | | 2 | |
| (C-4) Halogenated epoxy compound (5) | 10 | | | | 18 | |
| (C-5) Halogenated epoxy compound (6) | | 9 | 15 | | | 9 |
| (C-6) Halogenated epoxy compound (7) | | | | 7.5 | | |
| (D-1) Antimony trioxide | 5 | 5 | 5 | 5 | 6 | 4 |
| (D-3) Antimony pentoxide | | | | | | 1 |
| (E-1) Glass fiber | 53 | 53 | 43 | 70 | 55 | 53 |
| Thioether-type antioxidant | 0.35 | 0.35 | 0.35 | 0.35 | 0.35 | 0.35 |
| Phenol-type antioxidant | | 0.15 | 0.15 | 0.15 | 0.15 | 0.15 |
| PTFE | | | 0.20 | 0.20 | 0.20 | 0.20 |
| Flame retardancy (UL-94) (1/16 inch) | V-0 | V-0 | V-0 | V-0 | V-0 | V-0 |
| B-method flow ($10^{-2}$ cc/sec) | 15 | 18 | 12 | 13 | 13 | 22 |
| Tensile strength (MPa) | 155 | 151 | 150 | 168 | 157 | 151 |
| Wet heat resistance [30 hr, tensileness] (%) | 71 | 67 | 73 | 66 | 66 | 70 |
| Surface appearence of molded articles After heating | ○ | ○ | ○ | ○ | ○ | ○ |

B-method flow; Fluidity evaluation condition 3; Preheating time = 15 min.
Wet heat resistance: test hour = 30 hrs, Evaluation = Bending strength
Surface appearence of molded articles: Post-heating appearance evaluation condition 2; Heating for 4 hours

TABLE 32

| | Examples | | | | | |
|---|---|---|---|---|---|---|
| Resin compositions | 121 | 122 | 123 | 124 | 125 | 115 |
| Composition (Parts) | | | | | | |
| (A-5) Polyethylene terephthalate (5) | 100 | 100 | 100 | 100 | | 100 |
| (A-6) Polyethylene terephthalate (6) | | | | | 100 | |
| (B-9) Halogenated polystyrene resin (2) | 8 | | | 6 | 9 | 9 |
| (B-10) Halogenated polystyrene resin (3) | | 9 | 16 | | | |
| (C-4) Halogenated epoxy compound (5) | 10 | | | 8 | 9 | 9 |
| (C-5) Halogenated epoxy compound (6) | | 9 | | | | |
| (C-6) Halogenated epoxy compound (7) | | | 7 | | | |
| (D-1) Antimony trioxide | 5 | 5 | 6 | 4 | 5 | 5 |
| (E-1) Glass fiber | 50 | 50 | 30 | 45 | 50 | 53 |
| (F-1) Talc | 10 | 10 | 15 | | 10 | |
| (F-2) Mica | | | 15 | | | |

TABLE 32-continued

|  | Examples | | | | | |
|---|---|---|---|---|---|---|
| Resin compositions | 121 | 122 | 123 | 124 | 125 | 115 |
| (F-3) Kaolin |  |  |  | 5 |  |  |
| Thioether-type antioxidant | 0.35 | 0.35 | 0.35 | 0.35 | 0.35 | 0.35 |
| Phenol-type antioxidant |  | 0.15 | 0.15 | 0.15 | 0.15 |  |
| PTFE |  |  | 0.15 | 0.15 | 0.15 |  |
| Flame retardancy (UL-94) (1/16 inch) | V-0 | V-0 | V-0 | V-0 | V-0 | V-0 |
| B-method flow ($10^{-2}$ cc/sec) | 16 | 19 | 14 | 23 | 23 | 15 |
| Tensile strength (MPa) | 160 | 156 | 148 | 149 | 154 | 155 |
| Wet heat resistance [30 hr, tensileness] (%) | 74 | 67 | 68 | 68 | 69 | 71 |
| Surface appearance of molded articles After heating | ○ | ○ | ○ | ○ | ○ | ○ |
| Limit cooling time (sec) | 19 | 19 | 16 | 20 | 15 | 30 |

B-method flow; Fluidity evaluation condition 3; Preheating time = 15 min.
Wet heat resistance: test hour = 30 hrs, Evaluation = Bending strength
Surface appearance of molded articles: Post-heating appearance evaluation condition 2; Heating for 4 hours
Releasability "Limit cooling time": Releasability evaluation condition 2; Mold temperature = 120° C.

TABLE 33

|  | Comparative Examples | | | | |
|---|---|---|---|---|---|
| Comparative resin compositions | 76 | 77 | 78 | 79 | 80 |
| Composition (Parts) |  |  |  |  |  |
| (A-5) Polyethylene terephthalate (5) |  | 100 | 100 | 100 | 100 |
| (A-7) Polyethylene terephthalate (7) | 100 |  |  |  |  |
| (B-9) Halogenated polystyrene resin (2) | 8 | 20 | 8 | 9 |  |
| (B-10) Halogenated polystyrene resin (3) |  |  |  |  | 30 |
| (C-4) Halogenated epoxy compound (5) | 10 |  | 10 |  |  |
| (C-6) Halogenated epoxy compound (7) |  |  |  |  | 40 |
| (C-7) Halogenated epoxy compound (8) |  |  |  | 65 |  |
| (D-1) Antimony trioxide | 5 | 5 |  | 5 | 5 |
| (E-1) Glass fiber | 53 | 53 | 53 | 53 | 60 |
| Thioether-type antioxidant | 0.35 | 0.35 | 0.35 | 0.35 | 0.35 |
| Flame retardancy (UL-94) (1/16 inch) | V-0 | V-0 | notV |  |  |
| B-method flow ($10^{-2}$ cc/sec) | 4 | 40 | 16 |  |  |
| Tensile strength (MPa) | 154 | 149 | 155 |  |  |
| Surface appearance of molded articles After heating | Δ | ○ | Δ |  |  |
| Wet heat resistance [30 hr, tensileness] (%) | 40 | 40 | 73 | * | * |

B-method flow; Fluidity evaluation condition 3; Preheating time = 15 min.
Wet heat resistance: test hour = 30 hrs, Evaluation = Bending strength
Surface appearance of molded articles: post-heating appearance evaluation condition 2; Heating for 4 hours
*: Molded articles were not obtained.

TABLE 34

|  | Comparative Examples | | | | | |
|---|---|---|---|---|---|---|
| Comparative resin compositions | 81 | 82 | 83 | 84 | 85 | 86 |
| Composition (Parts) |  |  |  |  |  |  |
| (A-5) Polyethylene terephthalate (5) |  | 100 | 100 | 100 | 100 | 100 |
| (A-7) Polyethylene terephthalate (7) | 100 |  |  |  |  |  |
| (B-9) Halogeneted polystyrene resin (2) | 8 | 20 | 8 | 5 | 8 |  |
| (B-10) Halogenated polystyrene resin (3) |  |  |  |  |  |  |
| (C-4) Halogenated epoxy compound (5) | 10 |  | 10 |  | 10 |  |
| (C-7) Halogenated epoxy compound (8) |  |  |  | 70 |  |  |
| (D-1) Antimony trioxide | 5 | 4 |  | 4 | 4 | 4 |
| (E-1) Glass fiber | 50 | 50 | 50 | 50 | 20 | 50 |
| (F-1) Talc | 8 | 8 | 8 | 8 |  | 10 |
| (F-2) Mica |  |  |  |  | 70 |  |
| Thioether-type antioxidant | 0.35 | 0.35 | 0.35 | 0.35 | 0.35 | 0.35 |
| Flame retardancy (UL-94) (1/16 inch) | V-0 | V-0 | notV |  | V-0 | notV |
| B-method flow ($10^{-2}$ cc/sec) | 4 | 57 | 18 |  | 30 | 44 |
| Tensile strength (MPa) | 157 | 148 | 155 |  | 118 | 155 |
| Wet heat resistance [30 hr, tensileness] (%) | 40 | 42 | 68 |  | 50 | 40 |
| Surface appearance of molded articles After heating | Δ | ○ | Δ |  | ○ | ○ |
| Limit cooling time (sec) | 20 | 18 | 19 | * | 15 | 20 |

TABLE 34-continued

| | Comparative Examples | | | | | |
|---|---|---|---|---|---|---|
| Comparative resin compositions | 81 | 82 | 83 | 84 | 85 | 86 |

B-method flow; Fluidity evaluation condition 3; Preheating time = 15 min.
Wet heat resistance: test hour = 30 hrs, Evaluation = Bending strength
Surface appearance of molded articles: Post-heating appearance evaluation condition 2; Heating for 4 hours
Releasability "Limit cooling time": Releasability evaluation condition 2; Mold temperature = 120° C.
*: Molded articles were not obtained.

TABLE 35

| | Comparative Examples | | | | | |
|---|---|---|---|---|---|---|
| Resin compositions | 126 | 127 | 128 | 129 | 115 | 121 |
| Composition (Parts) | | | | | | |
| (A-5) polyethylene terephthalate (5) | 100 | 100 | 100 | 100 | 100 | 100 |
| (B-9) Halogenated polystyrene resin (2) | 8 | 9 | 9 | 9 | 8 | 8 |
| (C-4) Halogenated epoxy compound (5) | 10 | 11 | 11 | 11 | 10 | 10 |
| (D-1) Antimony trioxide | 5 | 5 | 5 | 5 | 5 | 5 |
| (E-1) Glass fiber | 53 | 53 | 50 | 50 | 53 | 50 |
| (F-1) Talc | | | 8 | 5 | | 10 |
| (G) Copolymer (1) | 9 | 18 | 9 | | | |
| (G) Copolymer (2) | | | | 9 | | |
| Thioether-type antioxidant | 0.35 | 0.35 | 0.35 | 0.35 | 0.35 | 0.35 |
| Surface gloss | Δ | ◯ | ◯ | ◯ | x | x |

Examples 130–144 and Comparative Examples 89–101 of the resin composition shown as Embodiment 8 above will be given below.

[EXAMPLE 130]

(A-5) Polyethylene terephthalate (5) 100 parts by weight,
(B-11) Tetrabromobisphenol A-type phenoxy compound (4) 9 parts by weight,
(C-4) Tetrabromobisphenol A-type epoxy compound (5) 9 parts by weight,
(D-1) Antimony trioxide 5 parts by weight,
and 0.35 parts by weight, of a phenol-type antioxidant were previously dry-blended, and then put into a hopper of a twin-screw extruder TEX44 manufactured by Nippon Seikosho K. K., having a cylinder temperature of 260° C. Moreover, 53 parts by weight of (E-1) Glass fiber was fed halfway and those were subjected to melt-extrusion to thus obtain a resin composition. The evaluated results are shown in Table 36.

[EXAMPLES 131–135]

Resin compositions having such compositions as shown in Table 36 were obtained in the same manner as in Example 130. The evaluated results are shown in Table 36.

[EXAMPLE 136]

(A-1) Polyethylene terephthalate (5) 100 parts by weight,
(B-11) Tetrabromobisphenol A-type phenoxy compound (4) 9 parts by weight,
(C-4) Tetrabromobisphenol A-type epoxy compound (5) 9 parts by weight,
(D-1) Antimony trioxide 5 parts by weight,
(F-1) Talc 10 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 50 parts by weight of (E-1) Glass fiber was fed halfway and those were subjected to melt-extrusion to thus obtain a resin composition. The evaluated results are shown in Table 37.

[EXAMPLES 137–140]

Resin compositions having such compositions as shown in Table 37 were obtained in the same manner as in Example 136. The evaluated results are shown in Table 37. For easier comparison, the evaluated results of Example 130 are also shown.

[Comparative Examples 87–96]

Resin compositions were obtained in the same manner as in Examples 130 and 136, except that components were admixed in proportions as shown in Tables 38 and 39. The evaluated results are shown in Tables 38 and 39.

As apparent from the comparison of Tables 36 and 37 for Examples and Tables 38 and 39 for Comparative Examples, the resin compositions of the present invention are excellent not only in flame retardancy, fluidity and tensile strength, but in wet heat resistance. Moreover, by the conjoint use of the specific class of inorganic compounds, those are excellent in releasability, too.

[EXAMPLE 141]

(A-5) Polyethylene terephthalate (5) 100 parts by weight,
(B-11) Tetrabromobisphenol A-type phenoxy compound (4) 9 parts by weight,
(C-4) Tetrabromobisphenol A-type epoxy compound (5) 9 parts by weight, (D-1) Antimony trioxide 5 parts by weight,
(G) Copolymer (1) 9 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 53 parts by weight of (E-1) Glass fiber was fed halfway and those were subjected to melt-extrusion to thus obtain a resin composition. The evaluated results are shown in Table 40.

[EXAMPLES 142–144]

Resin compositions having such compositions as shown in Table 40 were obtained in the same manner as in Example 141. The evaluated results are shown in Table 40. For easier comparison, the evaluated results of Examples 130 and 136 are also shown.

Table 40 shows that by the addition of the copolymer (1) or (2), surface gloss is good even in the case of molding by the use of a low temperature mold.

TABLE 36

| Resin compositions | Examples | | | | | |
|---|---|---|---|---|---|---|
| | 130 | 131 | 132 | 133 | 134 | 135 |
| Composition (Parts) | | | | | | |
| (A-5) polyethylene terephthalate (5) | 100 | 100 | 100 | 100 | 100 | 50 |
| (A-6) polyethylene terephthalate (6) | | | | | | 50 |
| (B-11) Halogenated phenoxy resin (4) | 9 | | | 20 | | 20 |
| (B-12) Halogenated phenoxy resin (5) | | 9 | 5 | | 2 | |
| (C-4) Haloganated epoxy compound (5) | 9 | | | | 18 | |
| (C-5) Halogenated epoxy compound (6) | | 9 | 15 | | | 5 |
| (C-6) Halogenated epoxy compound (7) | | | | 5 | | |
| (D-1) Antimony trioxide | 5 | 5 | 5 | 5 | 6 | 4 |
| (D-2) Antimony pentoxide | | | | | | 1 |
| (E-1) Glass fiber | 53 | 53 | 45 | 70 | 55 | 53 |
| Phenol-type antioxidant | 0.35 | 0.35 | 0.35 | 0.35 | 0.35 | 0.35 |
| Thioether-type antioxidant | | 0.15 | 0.15 | 0.15 | 0.15 | 0.15 |
| PTFE | | | 0.20 | 0.20 | 0.20 | 0.20 |
| Flame retardancy (UL-94) (1/16 inch) | V-0 | V-0 | V-0 | V-0 | V-0 | V-0 |
| B-method flow ($10^{-2}$ cc/sec) | 15 | 16 | 10 | 13 | 10 | 22 |
| Tensile strength (MPa) | 153 | 152 | 150 | 165 | 158 | 148 |
| Wet heat resistance [30 hr, tensileness] (%) | 70 | 68 | 74 | 66 | 66 | 69 |

B-method flow; Fluidity evaluation condition 3; Preheating time = 15 min.
Wet heat resistance: test hour = 30 hrs, Evaluation = Bending strength

TABLE 37

| Resin compositions | Examples | | | | | |
|---|---|---|---|---|---|---|
| | 136 | 137 | 138 | 139 | 140 | 130 |
| Composition (Parts) | | | | | | |
| (A-5) polyethylene terephthalate (5) | 100 | 100 | 100 | 100 | | 100 |
| (A-6) polyethylene terephthalate (6) | | | | | 100 | |
| (B-11) Halogenated phenoxy resin (4) | 9 | | | 6 | 9 | 9 |
| (B-12) Halogenated phenoxy resin (5) | | 9 | 18 | | | |
| (C-4) Halogenated epoxy compound (5) | 9 | | | 8 | 9 | 9 |
| (C-5) Halogenated epoxy compound (6) | | 9 | | | | |
| (C-6) Halogenated epoxy compound (7) | | | 5 | | | |
| (D-1) Antimony trioxide | 5 | 5 | 6 | 4 | 5 | 5 |
| (E-1) Glass fiber | 50 | 50 | 30 | 45 | 50 | 53 |
| (F-1) Talc | 10 | 10 | 15 | | 10 | |
| (F-2) Mica | | | 15 | | | |
| (F-3) Kaolin | | | | 5 | | |
| Phenol-type antioxidant | 0.35 | 0.35 | 0.35 | 0.35 | 0.35 | 0.35 |
| Thioether-type antioxidant | | 0.15 | 0.15 | 0.15 | | |
| PTFE | | | 0.15 | 0.15 | 0.15 | |
| Flame retardancy (UL-94) (1/16 inch) | V-0 | V-0 | V-0 | V-0 | V-0 | V-0 |
| B-method flow ($10^{-2}$ cc/sec) | 16 | 17 | 14 | 20 | 20 | 15 |
| Tensile strength (MPa) | 158 | 157 | 140 | 148 | 155 | 153 |
| Wet heat resistance [30 hr, tensileness] (%) | 74 | 68 | 67 | 69 | 70 | 70 |
| Limit cooling time (sec) | 18 | 19 | 14 | 19 | 14 | 30 |

B-method flow; Fluidity evaluation condition 3; Preheating time = 15 min.
Wet heat resistance: test hour = 30 hrs, Evaluation = Bending strength
Releasability "Limit cooling time": Releasability evaluation condition 2; Mold temperature = 120° C.

TABLE 38

|  | Comparative Examples | | | |
|---|---|---|---|---|
| Comparative resin compositions | 87 | 88 | 89 | 90 |
| Composition (Parts) | | | | |
| (A-5) polyethylene terephthalate (5) |  | 100 | 100 | 100 |
| (A-7) polyethylene terephthalate (7) | 100 | | | |
| (B-11) Halogenated phenoxy resin (4) | 9 | | 9 | |
| (B-12) Halogenated phenoxy resin (5) | | 20 | | 30 |
| (C-4) Halogenated epoxy compound (5) | 9 | | 9 | |
| (C-6) Halogenated epoxy compound (7) | | | | 40 |
| (D-1) Antimony trioxide | 5 | 5 | | 5 |
| (E-1) Glass fiber | 53 | 33 | 53 | 60 |
| Phenol-type antioxidant | 0.35 | 0.35 | 0.35 | 0.35 |
| Flame retardancy (UL-94) (1/16 inch) | V-0 | V-0 | notV | |
| B-method flow ($10^{-2}$ cc/sec) | 3 | 49 | 17 | |
| Tensile strength (MPa) | 154 | 148 | 155 | |
| Wet heat resistance [30 hr, tensileness] (%) | 42 | 38 | 72 | * |

B-method flow; Fluidity evaluation condition 3; Preheating time = 15 min.
Wet heat resistance: test hour = 30 hrs, Evaluation = Bending strength
*: Molded articles were not obtained.

Examples 145–157 and Comparative Examples 102–112 of the resin composition shown as Embodiment 9 above will be given below.

[EXAMPLE 145]

(A-5) Polyethylene terephthalate (5) 100 parts by weight,
(B'-1) Tetrabromobisphenol A-type epoxy compound (9) 15 parts by weight,
(D-3) Antimony trioxide 4 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 50 parts by weight of (E-1) Glass fiber was fed halfway and those were subjected to melt-extrusion to thus obtain a resin composition. The evaluated results are shown in Table 41.

[EXAMPLES 146–154]

Resin compositions having such compositions as shown in Table 41 were obtained in the same manner as in Example 145. The evaluated results are shown in Table 41.

TABLE 39

|  | Comparative Examples | | | | | |
|---|---|---|---|---|---|---|
| Comparative resin compositions | 91 | 92 | 93 | 94 | 95 | 96 |
| Composition (Parts) | | | | | | |
| (A-5) polyethylene telephthalate (5) |  | 100 | 100 | 100 | 100 | 100 |
| (A-7) polyethylene terephthalate (7) | 100 | | | | | |
| (B-11) Halogenated phenoxy resin (4) | 9 | | 9 | 5 | 9 | |
| (B-12) Halogenated phenoxy resin (5) | | 20 | | | | |
| (C-4) Halogenated epoxy compound (5) | 9 | | 9 | | 9 | |
| (C-7) Halogenated epoxy compound (8) | | | | 70 | | |
| (D-1) Antimony trioxide | 5 | 4 | | 4 | 4 | 4 |
| (E-1) Glass fiber | 50 | 50 | 50 | 50 | 20 | 50 |
| (F-1) Talc | 8 | 8 | 8 | 8 | | 10 |
| (F-2) Mica | | | | | 70 | |
| Phenol-type antioxidant | 0.35 | 0.35 | 3.35 | 0.35 | 0.35 | 0.35 |
| Flame retardancy (UL-94) (1/6 inch) | V-0 | V-0 | V-2 | | V-0 | notV |
| B-method flow ($10^{-2}$ cc/sec) | 3 | 56 | 18 | | 28 | |
| Tensile strength (MPa) | 155 | 147 | 156 | | 118 | 155 |
| Wet heat resistance [30 hr, tensileness] (%) | 43 | 40 | 70 | | 52 | 40 |
| Limit cooling time (sec) | 20 | 17 | 18 | * | 14 | 20 |

B-method flow; Fluidity evaluation condition 3; Preheating time = 15 min.
Wet heat resistance: test hour = 30 hrs, Evaluation = Bending strength
Releasability "Limit cooling time": Releasability evaluation condition 2; Mold temperature = 120° C.
*: Molded articles were not obtained.

TABLE 40

|  | Examples | | | | | |
|---|---|---|---|---|---|---|
| Resin compositions | 141 | 142 | 143 | 144 | 130 | 136 |
| Composition (Parts) | | | | | | |
| (A-5) polyethylene telephthalate (5) | 100 | 100 | 100 | 100 | 100 | 100 |
| (B-11) Halogenated phenoxy resin (4) | 9 | 10 | 10 | 10 | 9 | 9 |
| (C-4) Halogenated epoxy compound (5) | 9 | 10 | 10 | 10 | 9 | 9 |
| (D-1) Antimony trioxide | 5 | 5 | 5 | 5 | 5 | 5 |
| (E-1) Glass fiber | 53 | 53 | 50 | 50 | 53 | 50 |
| (F-1) Talc | | | 8 | 5 | | 10 |
| (G) Copolymer (1) | 9 | 18 | 9 | | | |
| (G) Copolymer (2) | | | | 9 | | |
| Phenol-type antioxidant | 0.35 | 0.35 | 3.35 | 0.35 | 0.35 | 0.35 |
| Surface gloss | Δ | ○ | ○ | ○ | x | x |

[EXAMPLE 155]

(A-5) Polyethylene terephthalate (5) 100 parts by weight,
(B'-1) Tetrabromobisphenol A-type epoxy compound (9) 17 parts by weight,
(D-1) Antimony trioxide 4 parts by weight,
(F-1) Talc 6 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 45 parts by weight of (E-1) Glass fiber was fed halfway and those were subjected to melt-extrusion to thus obtain a resin composition. The evaluated results are shown in Table 42.

[EXAMPLES 156–164]

Resin compositions having such compositions as shown in Table 42 were obtained in the same manner as in Example 155. The evaluated results are shown in Table 42. For easier comparison, the evaluated results of Example 149 are also shown.

[Comparative Examples 97–111]

Resin compositions were obtained in the same manner as in Examples 145 and 155, except that components were admixed in proportions as shown in Tables 43 and 44. The evaluated results are shown in Tables 43 and 44.

As apparent from the comparison of Tables 41 and 42 for Examples and Tables 43 and 44 for Comparative Examples, the resin compositions of the present invention are excellent in flame retardancy, mechanical strength, wet heat resistance and fluidity. Moreover, by the conjoint use of the specific class of inorganic compound (F), those are excellent in releasability, too.

[EXAMPLE 165]

(A-5) Polyethylene terephthalate (5) 100 parts by weight,
(B'-1) Tetrabromobisphenol A-type epoxy compound (10) 22 parts by weight,
(D-1) Antimony trioxide 5 parts by weight,
(G) Copolymer (1) 9 parts by weight,
and 0.35 parts by weight of a phenol-type antioxidant were previously dry-blended, and then put into a hopper of a twin-screw extruder TEX44 manufactured by Nippon Seikosho K. K., having a cylinder temperature of 260° C. Moreover, 60 parts by weight of (E-1) Glass fiber was fed halfway and those were subjected to melt-extrusion to thus obtain a resin composition. The evaluated results are shown in Table 45.

[EXAMPLES 166–165]

Resin compositions having such compositions as shown in Table 45 were obtained in the same manner as in Example 165. The evaluated results are shown in Table 45. For easier comparison, the evaluated results of Examples 146 and 161 are also shown.

Table 45 shows that by the addition of the copolymer (1) or (2), surface gloss is good even in the case of molding by the use of a low temperature mold.

TABLE 41

| Resin compositions | Examples | | | | | | | | | |
|---|---|---|---|---|---|---|---|---|---|---|
| | 145 | 146 | 147 | 148 | 149 | 150 | 151 | 152 | 153 | 154 |
| Composition (Parts) | | | | | | | | | | |
| (A-5) Polyethylene terephthalate (5) | 100 | 100 | 50 | 50 | | 100 | 100 | 50 | 50 | |
| (A-6) Polyethylene terephthalate (6) | | | 50 | 50 | 100 | | | 50 | 50 | 100 |
| (B'1) Halogenated epoxy (9) | 15 | | 15 | 10 | | | | | | |
| (B'2) Halogenated epoxy (10) | | 22 | | 12 | 22 | | | | | |
| (B'3) Halogenated epoxy (11) | | | | | | 15 | | 15 | 10 | |
| (B'4) Halogenated epoxy (12) | | | | | | | 22 | | 12 | 22 |
| (D-1) Antimony trioxide | | 5 | 4 | 5 | 5 | 4 | 5 | 4 | 5 | 5 |
| (D-3) Antimony pentoxide | 4 | | | | | 1 | | | | |
| (E-1) Glass fiber | 50 | 60 | 50 | 60 | 60 | 50 | 60 | 50 | 60 | 60 |
| Phenol-type antioxidant | 0.35 | 0.35 | 0.35 | 0.35 | 0.35 | 0.35 | 0.35 | 0.35 | 0.35 | 0.35 |
| Thioether-type antioxidant | | 0.15 | 0.15 | 0.15 | 0.15 | | 0.15 | 0.15 | 0.15 | 0.15 |
| PTFE | | 0.15 | 0.15 | 0.15 | | | 0.15 | 0.15 | 0.15 | |
| Flame retardancy (UL-94) (1/16 inch) | V-0 | V-0 | V-0 | V-0 | V-0 | V-0 | V-0 | V-0 | V-0 | V-0 |
| Tensile strength (MPa) | 47 | 157 | 161 | 155 | 151 | 149 | 155 | 160 | 157 | 152 |
| Wet heat resistance [30 hr, tensileness] (%) | 69 | 71 | 82 | 77 | 72 | 66 | 69 | 75 | 71 | 70 |
| B-method flow ($10^{-2}$ cc/sec) | 20 | 14 | 10 | 12 | 19 | 22 | 21 | 17 | 19 | 22 |

Wet heat resistance: test hour = 30 hrs, Evaluation = tensile strength
B-method flow; Fluidity evaluation condition 3; Preheating time = 15 min.

TABLE 42

| Resin compositions | Examples | | | | | | | | | | |
|---|---|---|---|---|---|---|---|---|---|---|---|
| | 155 | 156 | 157 | 158 | 159 | 160 | 161 | 162 | 163 | 164 | 149 |
| Composition (Parts) | | | | | | | | | | | |
| (A-5) Polyethylene terephthalate (5) | 100 | 100 | 100 | 100 | 100 | 100 | 100 | 100 | 100 | 100 | |
| (A-6) Polyethylene terephthalate (6) | | | | | | | | | | | 100 |
| (B'1) Halogenated epoxy (9) | 17 | | | | | | | | | | |
| (B'2) Halogenated epoxy (10) | | 25 | 25 | 25 | 25 | | | | | | 22 |
| (B'3) Halogenated epoxy (11) | | | | | | 17 | | | | | |
| (B'4) Halogenated epoxy (12) | | | | | | | 25 | 25 | 25 | 25 | |
| (D-1) Antimony trioxide | 4 | 5 | 5 | 5 | 5 | 4 | 5 | 5 | 5 | 5 | 5 |
| (E-1) Glass fiber | 45 | 50 | 50 | 50 | 50 | 45 | 50 | 50 | 50 | 50 | 60 |
| (F-1) Talc | 6 | 10 | 15 | | | 6 | 10 | 15 | | | |
| (F-2) Mica | | | | 10 | | | | | 10 | | |
| (F-3) Kaolin | | | | | 10 | | | | | 10 | |
| Phenol-type antioxidant | 0.35 | 0.35 | 0.35 | 0.35 | 0.35 | 0.35 | 0.35 | 0.35 | 0.35 | 0.35 | 0.35 |
| Thioether-type antioxidant | | | 0.15 | 0.15 | 0.15 | | 0.15 | 0.15 | 0.15 | 0.15 | |
| PTFE | | | 0.15 | 0.15 | 0.15 | | 0.15 | 0.15 | 0.15 | 0.15 | |
| Flame retardancy (UL-94) (1/16 inch) | V-0 | V-0 | V-0 | V-0 | V-0 | V-0 | V-0 | V-0 | V-0 | V-0 | V-0 |
| Tensile strength (MPa) | 157 | 155 | 149 | 152 | 146 | 158 | 155 | 150 | 151 | 146 | 151 |
| Wet heat resistanc [30 hr, tensileness] (%) | 74 | 72 | 60 | 70 | 72 | 67 | 7L | 68 | 67 | 66 | 72 |
| Limit cooling time (sec) | 16 | 14 | 13 | 15 | 15 | 15 | 14 | 13 | 15 | 15 | 26 |
| B-method flow ($10^{-2}$ cc/sec) | 11 | 13 | 15 | 13 | 11 | 18 | 21 | 21 | 19 | 19 | 19 |

Wet heat resistance: test hour = 30 hrs, Evaluation = tensile strength
B-method flow; Fluidity evaluation condition 3; Preheating time = 15 min.
Releasability "Limit cooling time": Releasability evaluation condition 1; Mold temperature = 140° C.

TABLE 43

| Comparative resin compositions | Comparative Examples | | | | | | | | |
|---|---|---|---|---|---|---|---|---|---|
| | 97 | 98 | 99 | 100 | 101 | 102 | 103 | 104 | 105 |
| Composition (Parts) | | | | | | | | | |
| (A-5) Polyethylene terephthalate (5) | | 100 | 100 | 100 | 100 | | 100 | 100 | 100 |
| (A-7) Polyethylene terephthalate (7) | 100 | | | | | 100 | | | |
| (B'1) Halogenated epoxy (9) | 15 | | 70 | 0.8 | 15 | | | | |
| (B'3) Halogenated epoxy (11) | | | | | | | 15 | 75 | 0.8 | 15 |
| (B'5) Brominated phenoxy (6) | | 15 | | | | | | | |
| (D-1) Antimony trioxide | 4 | 4 | 7 | 4 | | 4 | 7 | 4 | |
| (E-1) Glass fiber | 50 | 50 | 50 | 50 | 50 | 50 | 50 | 50 | 50 |
| Phenol-type antioxidant | 0.35 | 0.35 | 0.35 | 0.35 | 0.35 | 0.35 | 0.35 | 0.35 | 0.35 |
| Thioether-type antioxidant | 0.15 | 0.15 | 0.15 | 0.15 | 0.15 | 0.15 | 0.15 | 0.15 | 0.15 |
| PTFE | 0.15 | 0.15 | 0.15 | 0.15 | 0.15 | 0.15 | 0.15 | 0.15 | 0.15 |
| Flame retardancy (UL-94) (1/16 inch) | V-0 | V-0 | notV | V-2 | V-0 | | notV | V-2 | |
| Tensile strength (MPa) | 155 | 145 | | 144 | 153 | 157 | | 143 | 154 |
| Wet heat resistanc [30 hr, tensileness] (%) | 50 | 42 | | 42 | 77 | 50 | | 40 | 70 |
| B-method flow ($10^{-2}$ cc/sec) | 1.1 | 25 | 0.1* | 23 | 17 | 2.2 | 1.3* | 29 | 20 |

Wet heat resistance: test hour = 30 hrs, Evaluation = tensile strength
B-method flow; Fluidity evaluation condition 3; Preheating time = 15 min.
*: Molded articles were not obtained.

TABLE 44

| Comparative resin compositions | Comparative Examples | | | | | |
|---|---|---|---|---|---|---|
| | 106 | 107 | 108 | 109 | 110 | 111 |
| Composition (Parts) | | | | | | |
| (A-5) Polyethylene terephthalate (5) | | 100 | 100 | | 100 | 100 |
| (A-7) Polyethylene terephthalate (7) | 100 | | | 100 | | |
| (B'1) Halogenated epoxy (9) | 17 | 17 | 70 | | | |
| (B'3) Halogenated epoxy (11) | | | | 17 | 17 | 75 |
| (D-1) Antimony trioxide | 4 | 4 | 4 | 4 | 4 | 4 |
| (E-1) Glass fiber | 45 | 45 | 45 | 45 | 45 | 45 |
| (F-1) Talc | 6 | | 6 | 6 | | 6 |
| (F-2) Mica | | 65 | | | 65 | |
| Phenol-type antioxidant | 0.35 | 0.35 | 0.35 | 0.35 | 0.35 | 0.35 |
| Flame retardancy (UL-94) (1/16 inch) | V-0 | V-0 | | V-0 | V-0 | |
| Tensile strength (MPa) | 157 | 96 | | 158 | 99 | |
| Wet heat resistance [30 hr, tensileness] (%) | 46 18 | 54 13 | | 44 18 | 50 13 | |
| Limit cooling time (sec) | 1.2 | 6.7 | 0.1 | 1.9 | 8 | 1.0 |
| B-method flow ($10^{-2}$ cc/sec) | | | * | | | * |

Wet heat resistance: test hour = 30 hrs, Evaluation = tensile strength
B-method flow; Fluidity evaluation condition 3;
Preheating time = 15 min
Releasability "Limit cooling time": Releasability evalution condition 1; Mold temperature = 140° C.
*: Molded articles were not obtained.

TABLE 45

| Resin compositions | Examples | | | | | | | |
|---|---|---|---|---|---|---|---|---|
| | 165 | 166 | 167 | 168 | 169 | 170 | 146 | 161 |
| Composition (Parts) | | | | | | | | |
| (A-5) Polyethylene terephthalate (5) | 100 | 100 | | 100 | 100 | | 100 | 100 |
| (A-6) Polyethylene terephthalate (6) | | | 100 | | | 100 | | |
| (B'2) Halogenated epoxy (10) | 22 | 25 | 22 | | | 22 | 22 | |
| (B'4) Halogenated epoxy (12) | | | | 22 | 25 | | | 25 |
| (D-1) Antimony trioxide | 5 | 5 | 5 | 5 | 5 | 5 | 5 | 5 |
| (E-1) Glass fiber | 60 | 50 | 50 | 60 | 50 | 50 | 60 | 50 |
| (F-1) Talc | | 10 | 10 | | 10 | 10 | | 10 |
| (G) Copolymer (1) | 9 | 18 | 9 | 9 | 18 | 9 | | |
| (G) Copolymer (2) | | | 9 | | | 9 | | |
| Phenol-type antioxidant | 0.35 | 0.35 | 0.35 | 0.35 | 0.35 | 0.35 | 0.35 | 0.35 |
| Thioether-type antioxidant | 0.15 | | | 0.15 | | | 0.15 | |
| Surface gloss | Δ | ○ | ○ | Δ | ○ | ○ | x | x |

Industrial Applicability

As mentioned above, flame retardant polyethylene terephthalate resin compositions of the present invention are not only excellent in flame retardance and mechanical strength, but in wet heat resistance. Moreover, by the addition of the specific class of inorganic compounds, the resin compositions are also improved in releasability, which enables high-cycle molding.

We claim:

1. A flame retardant polyethylene terephthalate resin composition comprising (A) a polyethylene terephthalate resin containing ethylene terephthalate units as a main constituent, prepared by the use of a germanium compound as a catalyst (100 parts by weight), (B) at least one halogen flame retardant selected from the group consisting of halogenated polystyrene resins, halogenated epoxy compounds or resins and halogenated phenoxy resins (1–60 parts by weight), (C) at least one compound selected from the group consisting of epoxy compounds containing at least 2 epoxy groups in the molecule and carbodiimide compounds (0.05–20 parts by weight), (D) an antimony compound (0.1–20 parts by weight), and (E) a reinforcing filler (0–150 parts by weight).

2. A flame retardant polyethylene terephthalate resin composition of claim 1, wherein the halogen flame retardant (B) is at least one selected from the group consisting of halogenated polystyrene resins and halogenated polyα-methylstyrene resins, represented by the following general formula (I), halogenated bisphenol epoxy resins represented by the following general formula (II), and halogenated bisphenol phenoxy resins represented by the following general formula

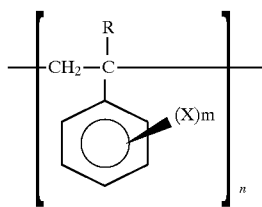

where R is H or CH$_3$, X is a halogen atom, m is an integer of 1–5, n is a number-average polymerization degree,

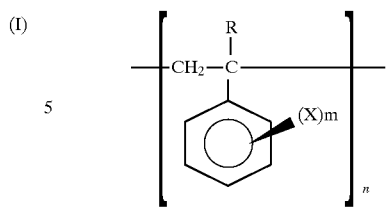

where R is H or CH, X is a halogen atom, m is an integer of 1–5, n is a number-average polymerization degree,

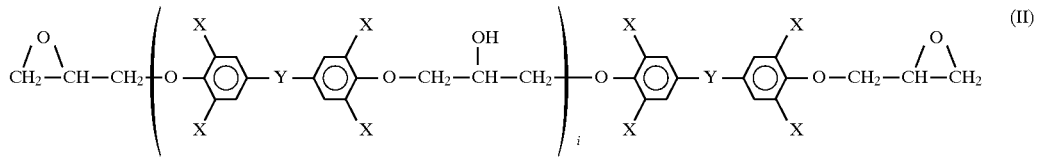

where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$— or direct bondage, i is a number-average polymerization degree,

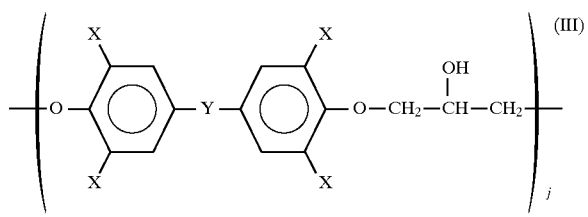

where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$— or direct bondage, j is an average polymerization degree.

3. A flame retardant polyethylene terephthalate resin composition comprising (A) a polyethylene terephthalate resin containing ethylene terephthalate units as a main constituent, prepared by the use of a germanium compound as a catalyst (100 parts by weight), (B') a halogen flame retardant containing at least 2 epoxy groups in the molecule (1–60 parts by weight), (D) an antimony compound (0.1–20 parts by weight), and (E) a reinforcing filler (0–150 parts by weight).

4. A flame retardant polyethylene terephthalate resin composition comprising (A) a polyethylene terephthalate resin containing ethylene terephthalate units as a main constituent, prepared by the use of a germanium compound as a catalyst (100 parts by weight), member selected from the group consisting of halogenated polystyrene resins and halogenated polyα-methylstyrene resins, represented by the following general formula (I) (1–60 parts by weight), (C) an epoxy compound containing at least 2 epoxy groups in the molecule (0.05–20 parts by weight), (D) an antimony compound (0.1–20 parts by weight), and (E) a reinforcing filler (0–150 parts by weight).

5. A flame retardant polyethylene terephthalate resin composition comprising (A) a polyethylene terephthalate resin containing ethylene terephthalate units as a main constituent, prepared by the use of a germanium compound as a catalyst (100 parts by weight), (B) at least one member selected from the group consisting of halogenated polystyrene resins and halogenated poly α-methylstyrene resins, represented by the following general formula (I) (1–50 parts by weight),

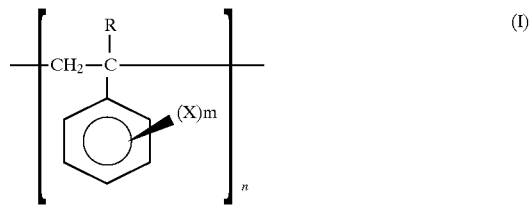

where R is H or CH, X is a halogen atom, m is an integer of 1–5, n is a number-average polymerization degree, (C) a carbodiimide compound (0.05–20 parts by weight), (D) an antimony compound (0.1–20 parts by weight), and (E) a reinforcing filler (0–150 parts by weight).

6. A flame retardant polyethylene terephthalate resin composition comprising (A) a polyethylene terephthalate resin containing ethylene terephthalate units as a main constituent, prepared by the use of a germanium compound as a catalyst (100 parts by weight), (B) a halogenated bisphenol epoxy resin having a skeleton represented by the following general formula (X), whose halogenation rate is not less than 10% and whose softening point is 85°–196° C. (1–60 parts by weight),

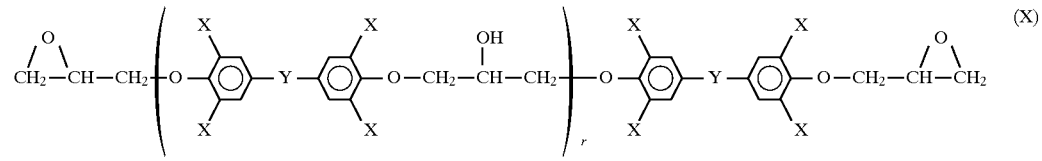

where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$— or a direct bond, r is a number-average polymerization degree of a real number of less than 12, (C) an epoxy compound containing at least 2 epoxy groups in the molecule and not containing halogen atoms (0.05–20 parts by weight), (D) an antimony compound (0.1–20 parts by weight), and (E) a reinforcing filler (0–150 parts by weight).

7. A flame retardant polyethylene terephthalate resin composition comprising (A) a polyethylene terephthalate resin containing ethylene terephthalate units as a main constituent, prepared by the use of a germanium compound as a catalyst (100 parts by weight), (B) a halogenated bisphenol epoxy resin having a skeleton represented by the following general formula (X), whose halogenation rate is not less than 10% and whose softening point is 85°–196° C. (1–60 parts by weight),

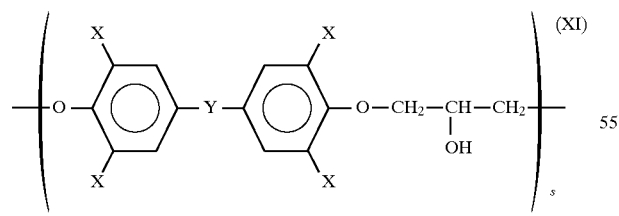

where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$— or a direct bond, r is a number-average polymerization degree of a real number of less than 12, (C) a carbodiimide compound (0.05–20 parts by weight), (D) an antimony compound (0.1–20 parts by weight), and (E) a reinforcing filler (0–150 parts by weight).

8. A flame retardant polyethylene terephthalate resin composition comprising (A) a polyethylene terephthalate resin containing ethylene terephthalate units as a main constituent, prepared by the use of a germanium compound as a catalyst (100 parts by weight), (B) a halogenated bisphenol phenoxy resin of high molecular weight having a skeleton represented by the following general formula (XI), whose halogenation rate is not less than 30% (1–60 parts by weight),

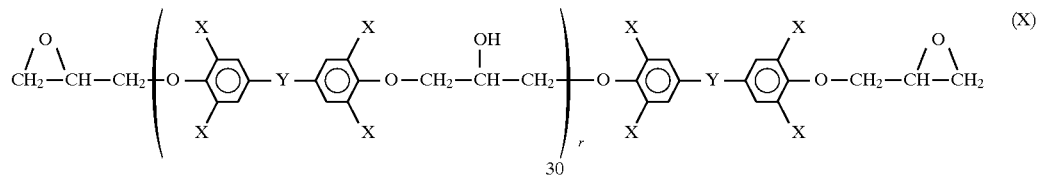

where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$— or a direct bond, s is an average polymerization degree of a real number of not less than 12, (C) an epoxy compound containing at least 2 epoxy groups in the molecule and not containing halogen atoms (0.05–20 parts by weight), (D) an antimony compound (0.1–20 parts by weight), and (E) a reinforcing filler (0–150 parts by weight).

9. A flame retardant polyethylene terephthalate resin composition comprising (A) a polyethylene terephthalate resin containing ethylene terephthalate units as a main constituent, prepared by the use of a germanium compound as a catalyst (100 parts by weight), (B) a halogenated bisphenol phenoxy resin of high molecular weight having a skeleton represented by the following general formula (XI), whose halogenation rate is not less than 30% (1–60 parts by weight),

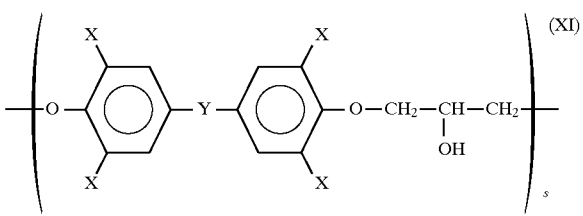

where at least one of a plurality of X is a halogen atom and the other are hydrogen atoms or halogen atoms, Y is alkylene group of C1–C10, alkylidene group, cycloalkane group, carbonyl group, —O—, —S—, —SO$_2$— or a direct bond, s is an average polymerization degree of a real number of not less than 12, (C) a carbodiimide compound (0.05–20 parts by weight), (D) an antimony compound (0.1–20 parts by weight), and (E) a reinforcing filler (0–150 parts by weight).

10. A flame retardant polyethylene terephthalate resin composition comprising the following (A), (B), (C), (D) and (E), wherein the total amount of (B) and (C) is 5–50 parts by weight, the weight ratio of (B)/(C) is 80/20–5/95, the amount of (C) is not less than 4 parts by weight, the amount of (D) is 0.1–20 parts by weight, and the amount of (E) is 0–150 parts by weight, per 100 parts by weight of (A):

(A) a polyethylene terephthalate resin containing ethylene terephthalate units as a main constituent, prepared by the use of a germanium compound as a catalyst, (B) a halogenated polystyrene resin represented by the following general formula (I)

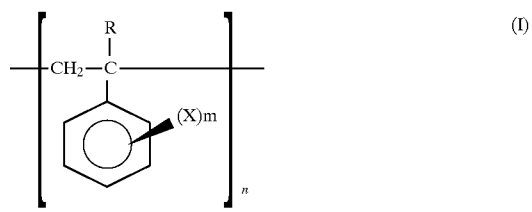

where R is H or CH, X is a halogen atom, m is an integer of 1–5, n is a number-average polymerization degree, (C) a halogenated epoxy compound having a skeleton represented by the following general formula (XII), whose halogenation rate is not less than 10% and whose epoxy equivalent is 700–2500

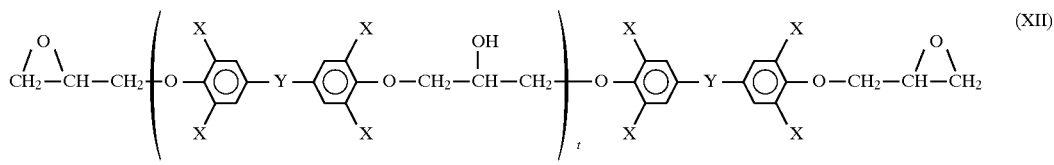

(XII)

where X is hydrogen atoms or halogen atoms, Y is alkylene group of C1–C10, alkylidene group, cycloalkane group, carbonyl group, —O—, —S—, —SO$_2$— or direct bondage, t is an average polymerization degree, (D) an antimony compound, and (E) a reinforcing filler.

11. A flame retardant polyethylene terephthalate resin composition comprising the following (A), (B), (C), (D) and (E), wherein the total amount of (B) and (C) is 5–50 parts by weight, the weight ratio of (B)/(C) is 90/10–1/99, the amount of (C) is not less than 3 parts by weight, the amount of (D) is 0.1–20 parts by weight, and the amount of (E) is 0–150 parts by weight, per 100 parts by weight of (A):

(A) a polyethylene terephthalate resin containing ethylene terephthalate units as a main constituent, prepared by the use of a germanium compound as a catalyst, (B) a halogenated phenoxy resin having a skeleton represented by the following general formula (XIII), whose halogenation rate is not less than 30% and whose epoxy equivalent is not less than 4000

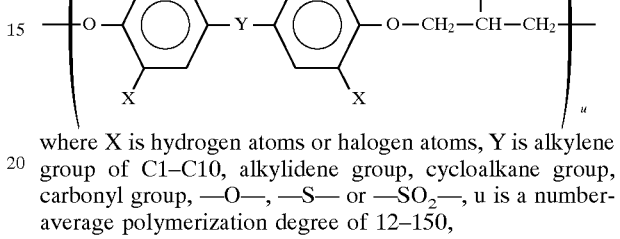

(XIII)

where X is hydrogen atoms or halogen atoms, Y is alkylene group of C1–C10, alkylidene group, cycloalkane group, carbonyl group, —O—, —S— or —SO$_2$—, u is a number-average polymerization degree of 12–150, (C) a halogenated epoxy compound having a skeleton represented by the following general formula (XIV), whose halogenation rate is not less than 30% and whose epoxy equivalent is 800–2500

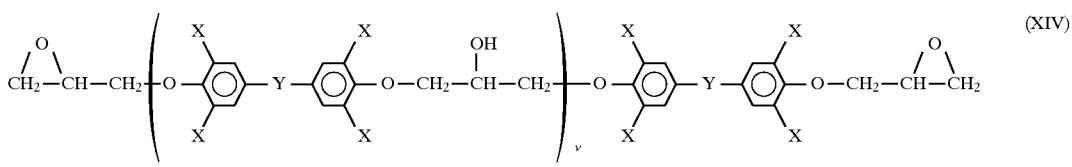

(XIV)

where X is hydrogen atoms or halogen atoms, Y is alkylene group of C1–C10, alkylidene group, cycloalkane group, carbonyl group, —O—, —S— or —SO$_2$—, v is a number-average polymerization degree, (D) an antimony compound, and (E) a reinforcing filler.

12. A flame retardant polyethylene terephthalate resin composition comprising (A) a polyethylene terephthalate resin containing ethylene terephthalate units as a main constituent, prepared by the use of a germanium compound as a catalyst (100 parts by weight), (B') a halogenated epoxy compound having a skeleton represented by the following general formula (XV), whose halogenation rate is not less than 10% and whose epoxy equivalent is 1500–6000 (1–60 parts by weight),

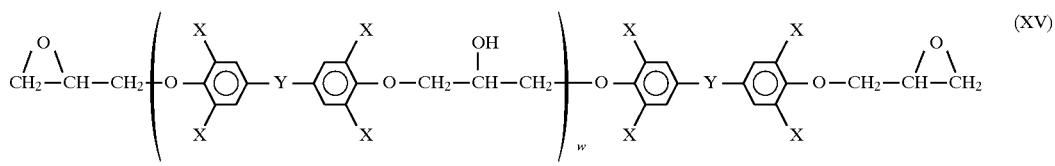

(XV)

where X is hydrogen atoms or halogen atoms, Y is alkylene group of C1–C10, alkylidene group, cycloalkane group, carbonyl group, —O—, —S—, —SO$_2$— or a direct bond, w is a number-average polymerization degree, (D) an antimony compound (0.1–20 parts by weight), and (E) a reinforcing filler (0–150 parts by weight).

13. A flame retardant polyethylene terephthalate resin composition of any one of claims 1–12, which further contains (F) at least one inorganic compound selected from the group consisting of silicates and silicic acid (0.1–60 parts by weight).

14. A flame retardant polyethylene terephthalate resin composition of any one of claims 1–12, which further contains (G) a crystallization accelerator (0.05–50 parts by weight).

15. A flame retardant polyethylene terephthalate resin composition of claim 14, wherein the crystallization accelerator is a polyester-polyether copolymer.

* * * * *